(12) United States Patent
Sugiyama

(10) Patent No.: US 7,589,881 B2
(45) Date of Patent: Sep. 15, 2009

(54) ELECTRO-OPTIC DEVICE AND ELECTRONIC APPARATUS

(75) Inventor: Nobuo Sugiyama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/265,820

(22) Filed: Nov. 6, 2008

(65) Prior Publication Data

US 2009/0116094 A1 May 7, 2009

(30) Foreign Application Priority Data

Nov. 7, 2007 (JP) ............................. 2007-289321

(51) Int. Cl.
G02F 1/03 (2006.01)
G02F 1/29 (2006.01)

(52) U.S. Cl. .................... 359/245; 359/250; 359/251; 359/252; 359/253; 359/254; 359/255; 359/259; 359/315; 359/316; 359/318; 359/320

(58) Field of Classification Search ............... 359/245, 359/250–255, 259, 298, 315–320
See application file for complete search history.

(56) References Cited

U.S. PATENT DOCUMENTS

| | | | | |
|---|---|---|---|---|
| 6,040,936 A * | 3/2000 | Kim et al. | ............... | 359/245 |
| 6,643,067 B2 * | 11/2003 | Miyamae et al. | ............ | 359/619 |
| 6,987,596 B2 * | 1/2006 | Otagiri et al. | ............... | 359/237 |
| 2003/0025977 A1 * | 2/2003 | Takizawa et al. | ........... | 359/245 |
| 2004/0012836 A1 * | 1/2004 | Li | .............. | 359/251 |
| 2004/0036945 A1 * | 2/2004 | Adachi | ...................... | 359/245 |
| 2005/0099668 A1 * | 5/2005 | Sugiyama | .................... | 359/254 |
| 2006/0187531 A1 * | 8/2006 | Hagood et al. | ............. | 359/298 |
| 2006/0221428 A1 * | 10/2006 | Yamada | ..................... | 359/245 |
| 2007/0183016 A1 * | 8/2007 | Kamijima et al. | ........... | 359/245 |

FOREIGN PATENT DOCUMENTS

| | | |
|---|---|---|
| JP | 08-331605 | 12/1996 |
| JP | 09-050019 | 2/1997 |
| JP | 2007-108501 | 4/2007 |

* cited by examiner

Primary Examiner—Evelyn A. Lester
(74) Attorney, Agent, or Firm—Workman Nydegger

(57) ABSTRACT

An electro-optic device includes first and second pixels that form first and second images, respectively. The first and second pixels are arranged alternately in a first direction. A light blocking element overlaps the pixels in plan view. The pixels are divided into pixel groups, each corresponding to every two pixels, which are one of the first pixels and one of the second pixels adjacent to each other in the first direction. The light blocking element has openings, each corresponding to one of the pixel groups and located in a region that overlaps the two pixels of the pixel group in plan view. Each first pixel has a light blocking region that partially intercepts light emitted from the first pixel. Each second pixel has a light blocking region that partially intercepts light emitted from the second pixel. The light blocking regions are positioned symmetrically to each other in plan view.

8 Claims, 26 Drawing Sheets

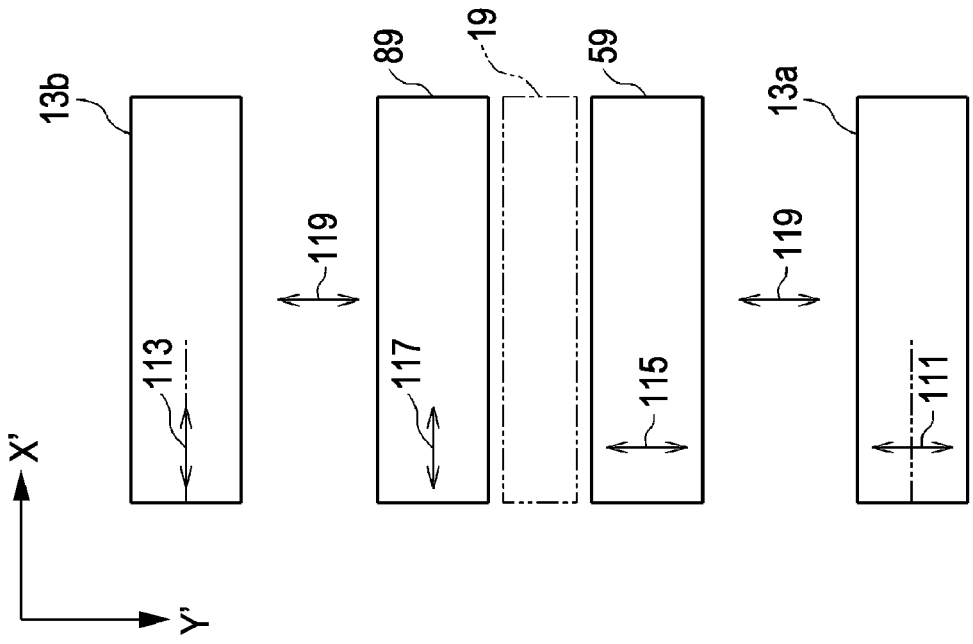
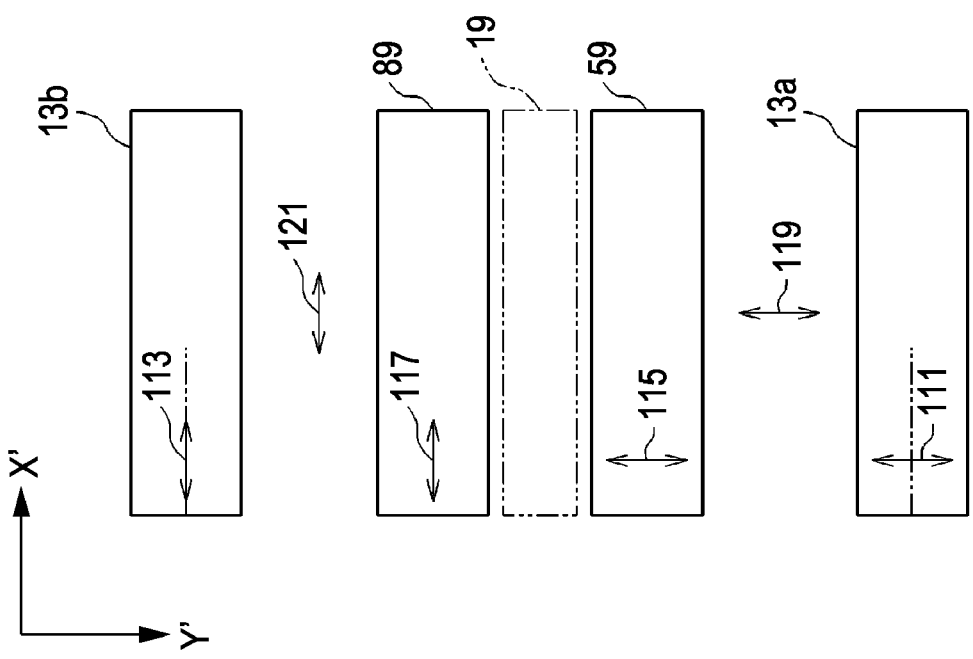

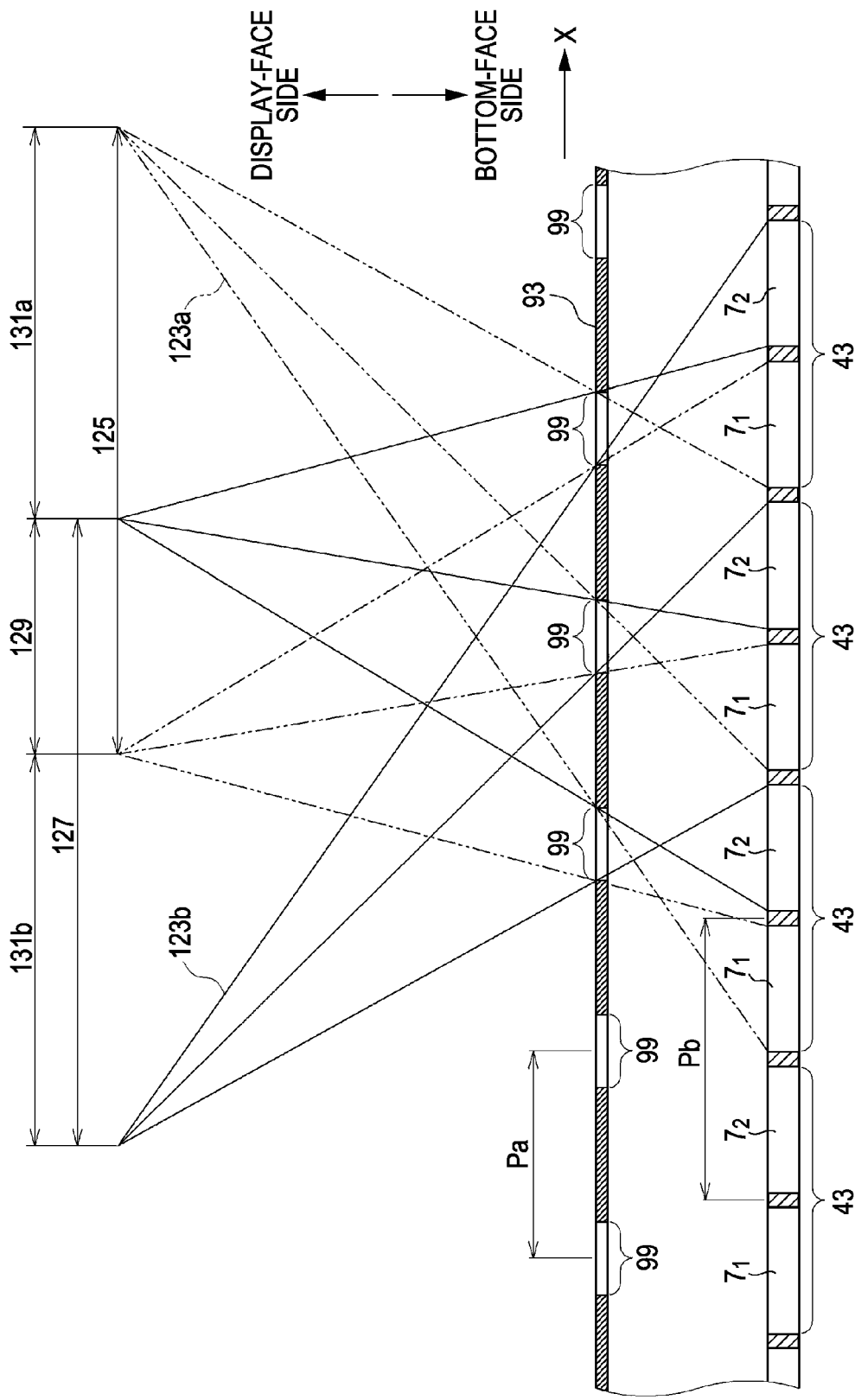

ELECTRO-OPTIC DEVICE AND ELECTRONIC APPARATUS

BACKGROUND

1. Technical Field

The present invention relates to electro-optic devices and electronic apparatuses.

2. Related Art

As an example of an electro-optic device, a display device that can display different images in accordance with various viewing angles is known (such display will be referred to as "directional display" hereinafter). JP-A-2007-108501 (pages 4 to 5 and FIG. 18) discloses an example of a display device of this type that can display different images at various visual points by means of a barrier having openings and light blocking portions.

Regarding a display device having a display panel for forming an image and the aforementioned barrier, the mechanism of how directional display is performed in two directions in the device will be described below with reference to cross-sectional views. Referring to FIG. 25A, a display panel 600 includes a first pixel 601 for displaying a first image and a second pixel 603 for displaying a second image. A barrier 605 has light blocking portions 607 that overlap with one section 601a of the first pixel 601 and with a first section 603a of the second pixel 603. In other words, an opening 609 located between the light blocking portions 607 is provided in a region that overlaps with another section 601b of the first pixel 601 and with another section 603b of the second pixel 603.

A first image is displayed in a first range 611 from which the first pixel 601 is visible through the opening 609. A second image is displayed in a second range 613 from which the second pixel 603 is visible through the opening 609. In other words, when the visual point is within the first range 611, the first image is visible from that visual point. When the visual point is within the second range 613, the second image is visible from that visual point.

The first range 611 and the second range 613 overlap each other, and this overlapping range is referred to as a range 615. From a visual point within the range 615, the first image and the second image would appear in a superposed state. From a visual point within a range 619a which is obtained by excluding the range 615 from the first range 611, only the first image is visible. From a visual point within a range 619b which is obtained by excluding the range 615 from the second range 613, only the second image is visible. The range 619a and the range 619b are respectively referred to as an effective visible range 619a and an effective visible range 619b.

The display panel 600 is generally provided with switching elements in correspondence with the pixels 601 and 603. Switching elements are configured to switch between light emission and light blocking modes with respect to the pixels 601 and 603. As shown in FIG. 26 in plan view, the pixels 601 and 603 are provided with light blocking regions 621 where light can be blocked due to, for example, the switching elements.

FIG. 25B is a cross-sectional view taken along line XXVB-XXVB in FIG. 26. As shown in FIG. 25B, the light beams emitted from the pixels 601 and 603 and respectively covering the effective visible ranges 619a and 619b through the opening 609 differ in quantity between the effective visible range 619a and the effective visible range 619b due to the light blocking regions 621.

In other words, the display device of the related art is problematic in that the image brightness tends to vary between multiple images in directional display.

SUMMARY

An advantage of some aspects of the invention is that an electro-optic device that solves at least part of the aforementioned problem and an electronic apparatus equipped with such an electro-optic device are provided.

According to a first aspect of the invention, an electro-optic device is provided, which includes a plurality of pixels at least including first pixels that form a first image and second pixels that form a second image, the first pixels and the second pixels being arranged alternately in a first direction; and a light blocking element that overlaps the plurality of pixels in plan view. The plurality of pixels are divided into a plurality of pixel groups, each pixel group corresponding to every two pixels of the plurality of pixels, the two pixels being one of the first pixels and one of the second pixels that are adjacent to each other in the first direction. The light blocking element has openings, each opening being provided for a corresponding one of the pixel groups and located in a region that overlaps the two pixels of the pixel group in plan view. Each first pixel has a light blocking region that partially intercepts light to be emitted from the first pixel, and each second pixel has a light blocking region that partially intercepts light to be emitted from the second pixel, the light blocking regions of the first pixel and the second pixel in each pixel group being positioned symmetrically to each other in plan view.

In the electro-optic device according to the first aspect, the visible range of each of the pixels in a pixel group can be determined by the corresponding opening in the light blocking element. Specifically, the first image is viewable from a range (referred to as a "first range" hereinafter) in which the first pixel is visible, and the second image is viewable from a range (referred to as a "second range" hereinafter) in which the second pixel is visible. In other words, the electro-optic device according to the first aspect can perform directional display in at least two directions through the openings provided in the light blocking element.

As described above, in the electro-optic device according to the first aspect, the first and second pixels have light blocking regions that partially intercept light to be emitted from the respective pixels, the light blocking regions of the first pixel and the second pixel in each pixel group being positioned symmetrically to each other in plan view. Accordingly, the quantity of light reaching the first range from each first pixel through the corresponding opening and the quantity of light reaching the second range from each second pixel through the corresponding opening can be made uniform more readily, whereby the image brightness can be made uniform more readily between the first image and the second image in directional display.

In the aforementioned electro-optic device, it is preferable that, in plan view of the first pixels, the position of the light blocking regions in the first pixels be consistent among the pixel groups arranged in the first direction.

In each pixel group, the light blocking region in the first pixel and the light blocking region in the second pixel are positioned symmetrically to each other. Therefore, in plan view of the second pixels, the position of the light blocking regions in the second pixels is also consistent among the pixel groups arranged in the first direction. As a result, the quantity of light reaching the first range from the first pixels through the openings and the quantity of light reaching the second range from the second pixels through the openings can be made uniform more readily among the pixel groups arranged in the first direction.

In the aforementioned electro-optic device, it is preferable that the first pixels and the second pixels be also arranged alternately in a second direction that is orthogonal to the first direction. Moreover, it is preferable that, in plan view of the first pixels, the position of the light blocking regions in the first pixels be consistent among the first pixels arranged in the second direction.

In this case, since the first pixels and the second pixels can also be arranged alternately in the second direction orthogonal to the first direction, the plurality of pixels groups would also be arranged in the direction orthogonal to the first direction. In addition, since the position of the light blocking regions in the first pixels in plan view thereof may be consistent among the first pixels arranged in the second direction, the quantity of light reaching the first range from the first pixels through the openings and the quantity of light reaching the second range from the second pixels through the openings can be made uniform more readily among the plurality of pixel groups arranged in the direction orthogonal to the first direction.

In the aforementioned electro-optic device, the light blocking regions in the first pixel and the second pixel in each pixel group may be positioned symmetrically to each other with respect to a line between the first pixel and the second pixel in plan view.

In the aforementioned electro-optic device, the light blocking regions in the first pixel and the second pixel in each pixel group may be positioned symmetrically to each other with respect to a point between the first pixel and the second pixel in plan view.

In the aforementioned electro-optic device, it is preferable that the light blocking regions in the first pixel and the second pixel in each pixel group overlap the corresponding opening of the light blocking element in plan view.

In the aforementioned electro-optic device, it is preferable that the light blocking regions in the first pixel and the second pixel in each pixel group be disposed outside a border of the corresponding opening of the light blocking element in plan view.

In this case, since the light blocking regions in the first pixel and the second pixel in each pixel group may be disposed outside the border of the corresponding opening of the light blocking element in plan view, an undesirable reduction in the quantity of light passing through the opening can be prevented more readily. As a result, the first image and the second image can be displayed with satisfactory brightness in directional display.

According to a second aspect of the invention, an electronic apparatus is provided, which includes the aforementioned electro-optic device as a display portion.

In the electronic apparatus according to the second aspect, the electro-optic device serving as a display portion includes a plurality of pixels and a light blocking element. The plurality of pixels at least include first pixels and second pixels. The first pixels and the second pixels are arranged alternately at least in a first direction. The plurality of pixels are divided into a plurality of pixel groups, each pixel group corresponding to every two pixels of the plurality of pixels, the two pixels being one of the first pixels and one of the second pixels that are adjacent to each other in the first direction. The light blocking element overlaps the plurality of pixels in plan view. The light blocking element has openings, each opening being provided for a corresponding one of the pixel groups and located in a region that overlaps the two pixels of the pixel group in plan view.

In this electro-optic device, the visible range of each of the pixels in a pixel group can be determined by the corresponding opening in the light blocking element. Specifically, the first image is viewable from a range (referred to as a "first range" hereinafter) in which the first pixel is visible, and the second image is viewable from a range (referred to as a "second range" hereinafter) in which the second pixel is visible. In other words, this electro-optic device can perform directional display in at least two directions through the openings provided in the light blocking element.

As described above, in this electro-optic device, the first and second pixels have light blocking regions that partially intercept light to be emitted from the respective pixels, the light blocking regions of the first pixel and the second pixel in each pixel group being positioned symmetrically to each other in plan view. Accordingly, the quantity of light reaching the first range from each first pixel through the corresponding opening and the quantity of light reaching the second range from each second pixel through the corresponding opening can be made uniform more readily, whereby the image brightness can be made uniform more readily between the first image and the second image in directional display.

Because the electronic apparatus according to the second aspect has a display portion defined by an electro-optic device that can make the image brightness uniform more readily between a first image and a second image in directional display, the display portion in the electronic apparatus is capable of making the image brightness uniform more readily between a first image and a second image.

BRIEF DESCRIPTION OF THE DRAWINGS

The invention will be described with reference to the accompanying drawings, wherein like numbers reference like elements.

FIGS. 12A and 12B each illustrate a polarization state in the display device according to the embodiment.

FIG. 13 is a schematic cross-sectional view of the plurality of pixel groups and the light blocking layer according to the embodiment.

DESCRIPTION OF EXEMPLARY EMBODIMENTS

A display device, which is an example of an electro-optic device according to an embodiment of the invention, will be described below with reference to the drawings.

Figure 1:
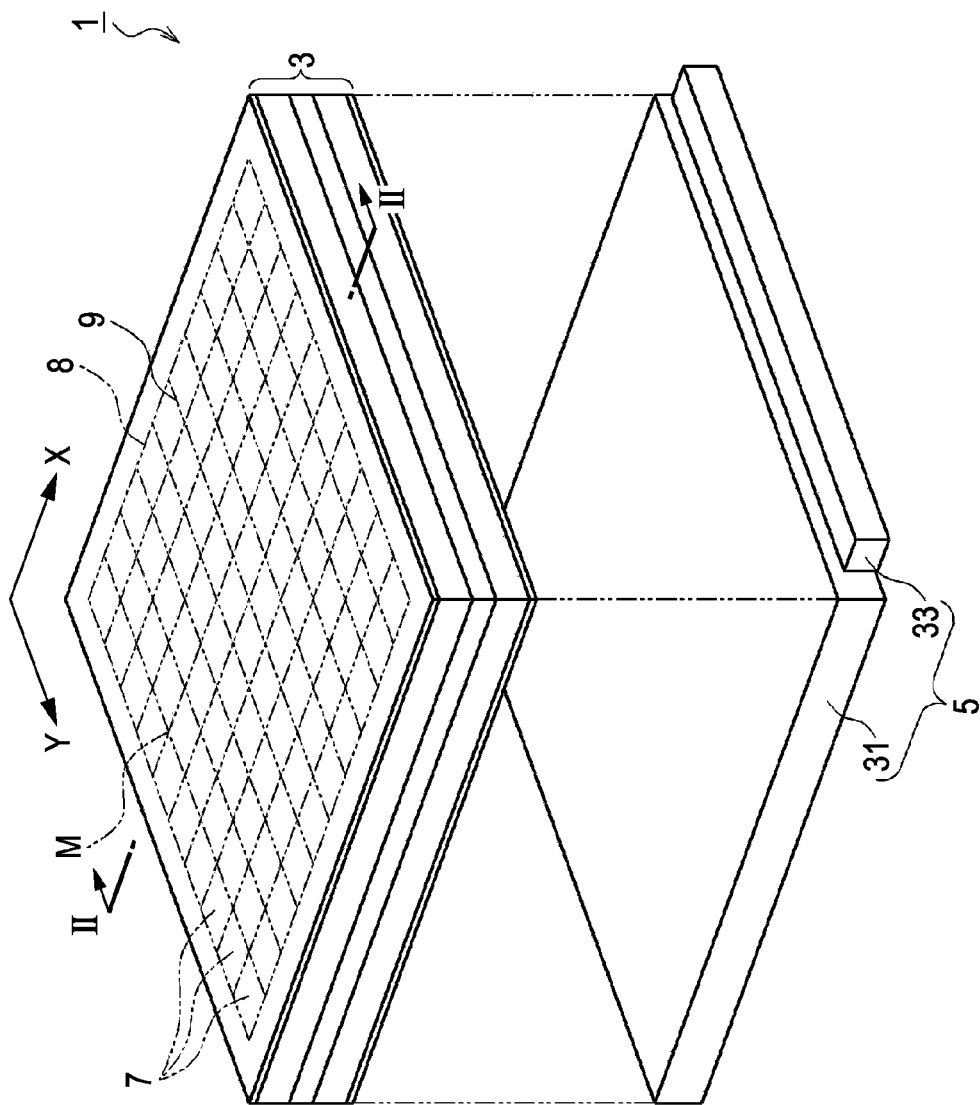
FIG. 1 is an exploded perspective view showing the main part of a display device according to an embodiment of the invention.

Referring to FIG. 1, a display device 1 according to an embodiment of the invention includes a display panel 3 and an illuminating unit 5.

The display panel 3 has a plurality of pixels 7. The pixels 7 are arranged within a display area 8 in an X-axis direction and a Y-axis direction in FIG. 1 so as to form a matrix M, the X-axis direction corresponding to the row direction and the Y-axis direction corresponding to the column direction. In the display device 1, the light from the illuminating unit 5 is received by the display panel 3 and is selectively emitted from the pixels 7 in the display panel 3 through a display face 9, whereby an image can be displayed on the display face 9. The display area 8 is where an image can be displayed. To provide a better understanding of the configuration, the pixels 7 in FIG. 1 are shown at a larger scale in reduced number.

Figure 2:
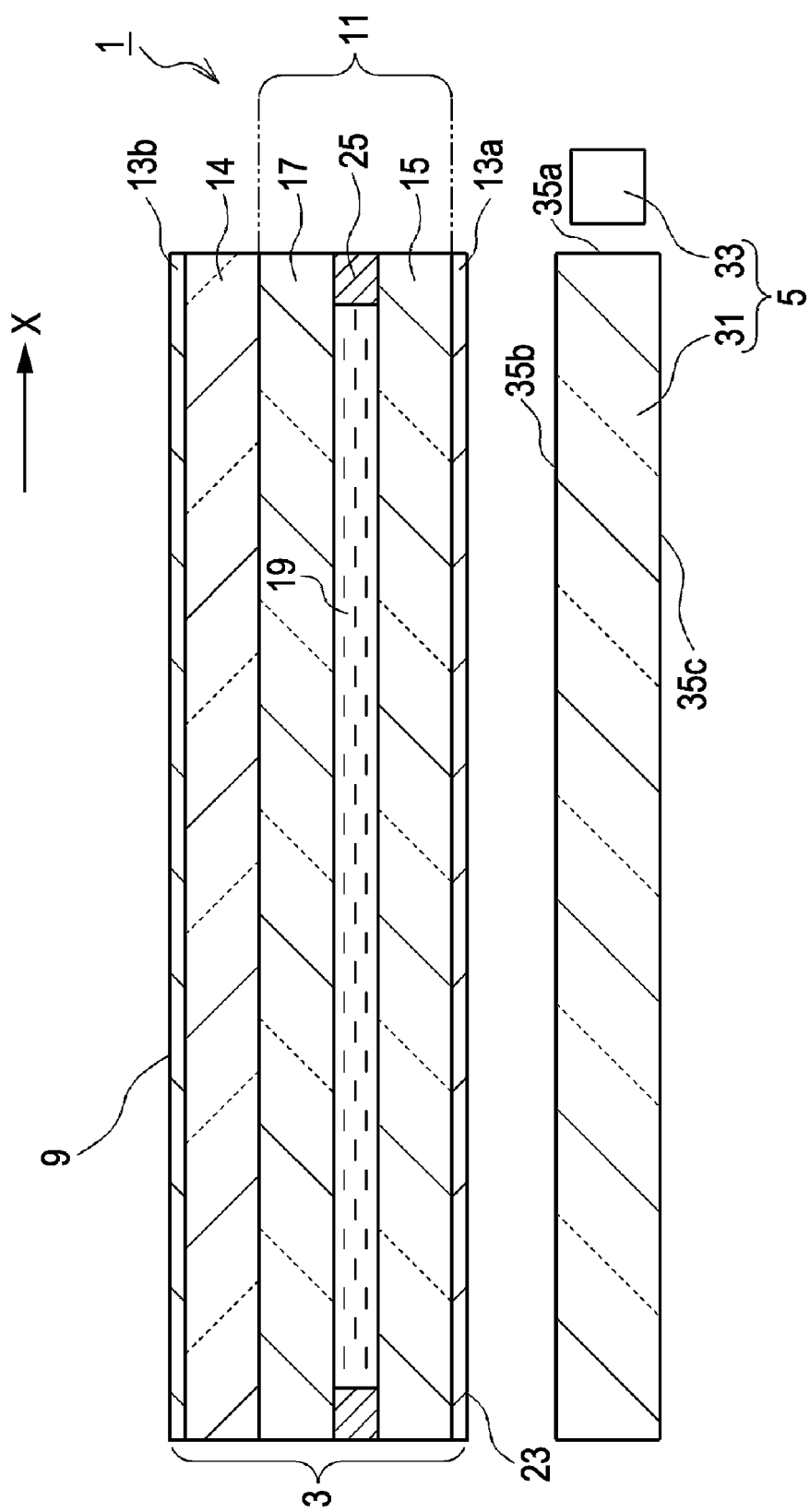
FIG. 2 is a cross-sectional view taken along line II-II in FIG. 1.

FIG. 2 is a cross-sectional view taken along line II-II in FIG. 1. As shown in FIG. 2, the display panel 3 includes a liquid crystal panel 11, polarizing plates 13a and 13b, and a barrier substrate 14.

The liquid crystal panel 11 includes a driver-element substrate 15, a counter substrate 17, and liquid crystal 19.

The driver-element substrate 15 has on its display face 9 side, i.e., liquid crystal 19 side, switching elements and the like in correspondence to the plurality of pixels 7.

The counter substrate 17 is disposed on the display face 9 side relative to the driver-element substrate 15 and faces the driver-element substrate 15 from that side with a certain gap therebetween. The display panel 3 has a bottom face 23 which corresponds to the underside of the display face 9. The counter substrate 17 has on its bottom face 23 side, i.e., liquid crystal 19 side, counter electrodes and the like.

The liquid crystal 19 is interposed between the driver-element substrate 15 and the counter substrate 17, and is sealed between the driver-element substrate 15 and the counter substrate 17 by means of a seal member 25 that surrounds the display area 8 by extending along the edges of the display panel 3. In this embodiment, the liquid crystal 19 is of a twisted nematic (TN) type.

The barrier substrate 14 is disposed on the display face 9 side relative to the counter substrate 17 and faces the counter substrate 17 from that side.

The polarizing plate 13a is disposed on the bottom face 23 side of the driver-element substrate 15. On the other hand, the polarizing plate 13b is disposed on the display face 9 side of the barrier substrate 14. In the display device 1, the polarizing plates 13a and 13b are disposed such that the light transmission axis in the polarizing plate 13a and the light transmission axis in the polarizing plate 13b extend orthogonally to each other. Each of the polarizing plates 13a and 13b is capable of transmitting light having a polarization axis extending in the direction of the transmission axis.

The illuminating unit 5 is provided at the bottom face 23 side of the display panel 3 and includes a light guide plate 31 and a light source 33. The light guide plate 31 is disposed below the display panel 3 in FIG. 2 and has a light emission face 35b that faces the bottom face 23 of the display panel 3.

The light source 33 may be, for example, light emitting diodes (LEDs) or a cold-cathode tube, and is disposed to the right of a side face 35a of the light guide plate 31 in FIG. 2.

Light emitted from the light source 33 enters the side face 35a of the light guide plate 31. The light incident on the light guide plate 31 is emitted from the light emission face 35b while the light is repetitively reflected within the light guide plate 31. The light emitted from the light emission face 35b enters the display panel 3 through the bottom face 23 and the polarizing plate 13a of the display panel 3. Where necessary, the light guide plate 31 may be provided with a diffuser plate on the light emission face 35b and a reflector plate on a bottom face 35c.

Figure 3:
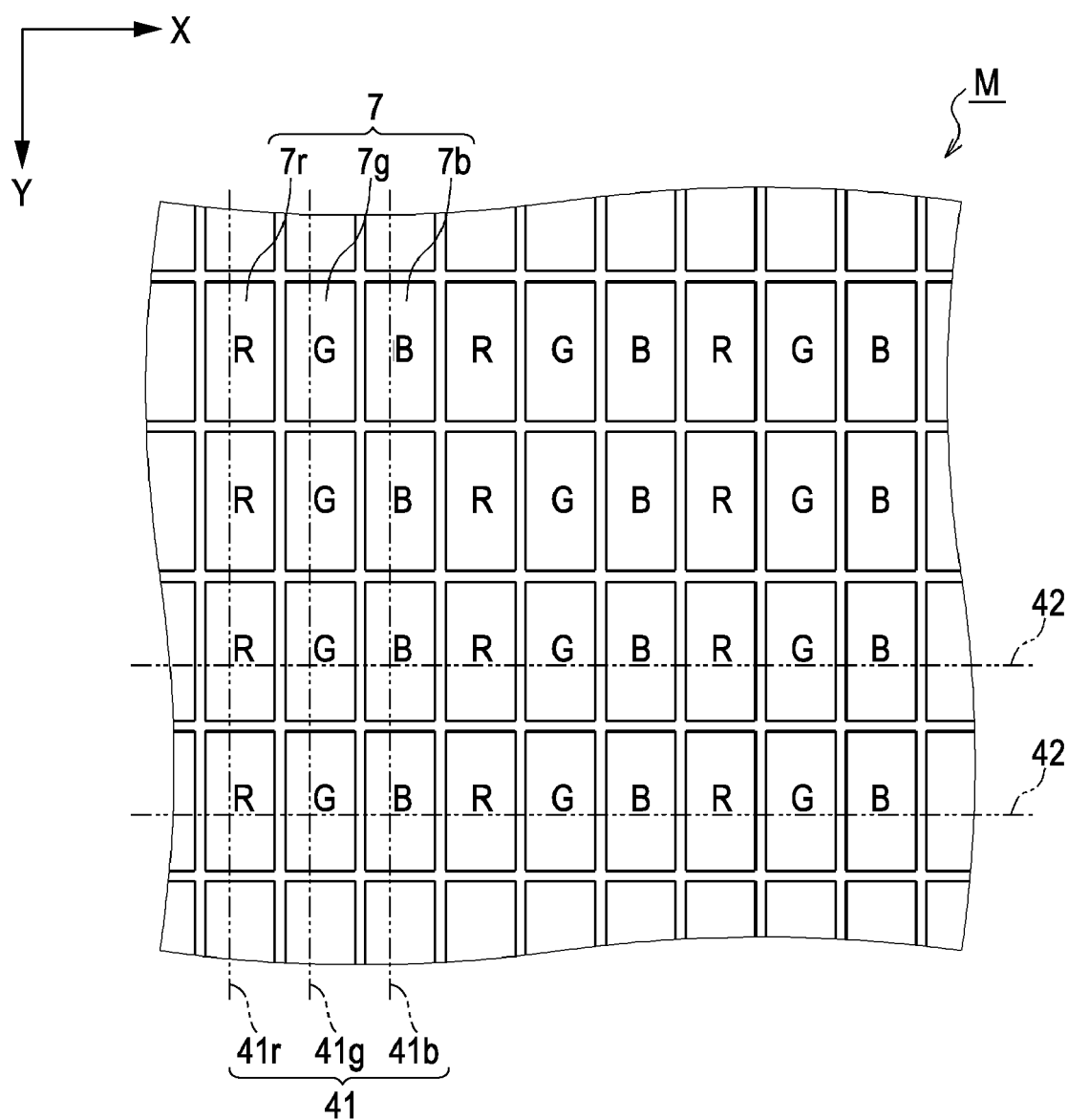
FIG. 3 is a plan view showing some of a plurality of pixels according to the embodiment.

Referring to FIG. 3, each of the pixels 7 in the display panel 3 is set such that it is configured to emit red-based (R), green-based (G), or blue-based (B) color light from the display face 9. Specifically, the plurality of pixels 7 forming the matrix M include pixels 7r emitting R light, pixels 7g emitting G light, and pixels 7b emitting B light.

It should be noted that R color is not limited to a pure red color, and may include, for example, an orange color. Furthermore, it should be noted that G color is not limited to a pure green color, and may include, for example, a blue-green color or yellow-green color. Moreover, it should be noted that B color is not limited to a pure blue color, and may include, for example, a violet color or blue-green color. From another viewpoint, R-colored light can be defined as light with a peak wavelength above or equal to 570 nm in a visible region. G-colored light can be defined as light with a peak wavelength within a range of 500 nm to 565 nm. B-colored light can be defined as light with a peak wavelength within a range of 415 nm to 495 nm.

In the matrix M, an array of pixels 7 arranged in the Y-axis direction constitutes one pixel column 41, and an array of pixels 7 arranged in the X-axis direction constitutes one pixel row 42. The pixels 7 in each pixel column 41 are configured such that the color of light to be emitted therefrom is set to one of R, G, and B colors. In other words, the matrix M includes pixel columns 41r each having a plurality of pixels 7r arranged in the Y-axis direction, pixel columns 41g each having a plurality of pixels 7g arranged in the Y-axis direction, and pixel columns 41b each having a plurality of pixels 7b arranged in the Y-axis direction. Furthermore, in the matrix M, the pixel columns 41r, the pixel columns 41g, and the pixel columns 41b are repetitively arranged in that order in the X-axis direction.

Figure 4:
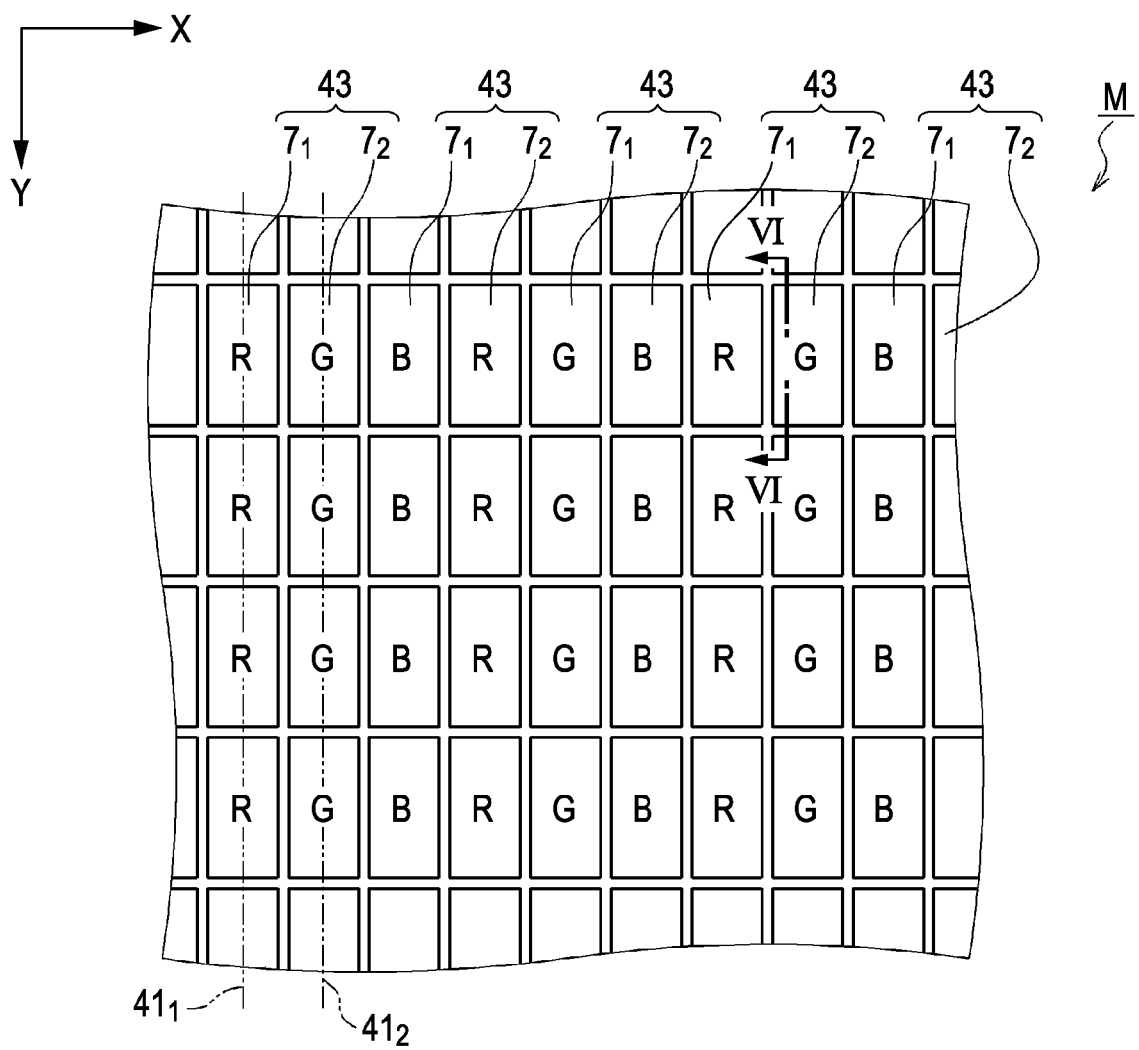
FIG. 4 is a plan view showing some of the pixels according to the embodiment.

Referring to FIG. 4, in the display device 1, the plurality of pixels 7 forming the matrix M are divided into a plurality of first pixels $7_1$ and a plurality of second pixels $7_2$. The display device 1 is configured such that light received by the display panel 3 from the illuminating unit 5 is emitted from the display face 9 of the display panel 3 selectively through the plurality of first pixels $7_1$, whereby a first image can be displayed on the display face 9. The display device 1 is also configured such that light received by the display panel 3 from the illuminating unit 5 is emitted from the display face 9 of the display panel 3 selectively through the plurality of second pixels $7_2$, whereby a second image can be displayed on the display face 9.

It should be noted that the first image and the second image may either be different images or the same image. In the description hereinafter, the term "pixels 7", the terms "pixels 7r", "pixels 7g", and "pixels 7b", and the terms "first pixels $7_1$," and "second pixels $7_2$" will be appropriately used to distinguish different definitions. When differentiating R, G, and B colors among the first pixels $7_1$ and among the second pixels $7_2$, the terms "first pixels $7r_1$", "first pixels $7g_1$", and "first pixels $7b_1$" and the terms "second pixels $7r_2$", "second pixels $7g_2$", and "second pixels $7b_2$" will appropriately be used.

In the display device 1, the first pixels $7_1$ and the second pixels $7_2$ are arranged alternately in the X-axis direction. Each pixel column 41 is constituted by a plurality of first pixels $7_1$ or a plurality of second pixels $7_2$. In other words, the matrix M includes pixel columns $41_1$ each having a plurality of first pixels $7_1$ arranged in the Y-axis direction, and pixel columns $41_2$ each having a plurality of second pixels $7_2$ arranged in the Y-axis direction. In the description hereinafter, the term "pixel columns 41", the terms "pixel columns 41r", "pixel columns 41g", and "pixel columns 41b", and the terms "pixel columns $41_1$" and "pixel columns $41_2$" will be appropriately used to distinguish different definitions. When differentiating R, G, and B colors among the pixel columns $41_1$ and among the pixel columns $41_2$, the terms "pixel columns $41r_1$", "pixel columns $41g_1$", and "pixel columns $41b_1$", and the terms "pixel columns $41r_2$", "pixel columns $41g_2$", and "pixel columns $41b_2$" will appropriately be used.

In the display device 1, the plurality of pixels 7 forming the matrix M are divided into multiple pixel groups 43, each group corresponding to every two neighboring pixels 7 which are a first pixel $7_1$ and second pixel $7_2$ adjacent to each other in the X-axis direction. The order of arrangement for the first pixel $7_1$ and second pixel $7_2$ in each pixel group 43 is consistent among the multiple pixel groups 43. In this embodiment, the order of arrangement is such that, as shown in FIG. 4, the first pixel $7_1$ is disposed at the left side and the second pixel $7_2$ is disposed at the right side in each pixel group 43 as viewed in the X-axis direction. Alternatively, the order of arrangement for the first pixel $7_1$ and second pixel $7_2$ in each pixel group 43 is reversible as long as the order of arrangement is consistent among the multiple pixel groups 43.

Figure 5:
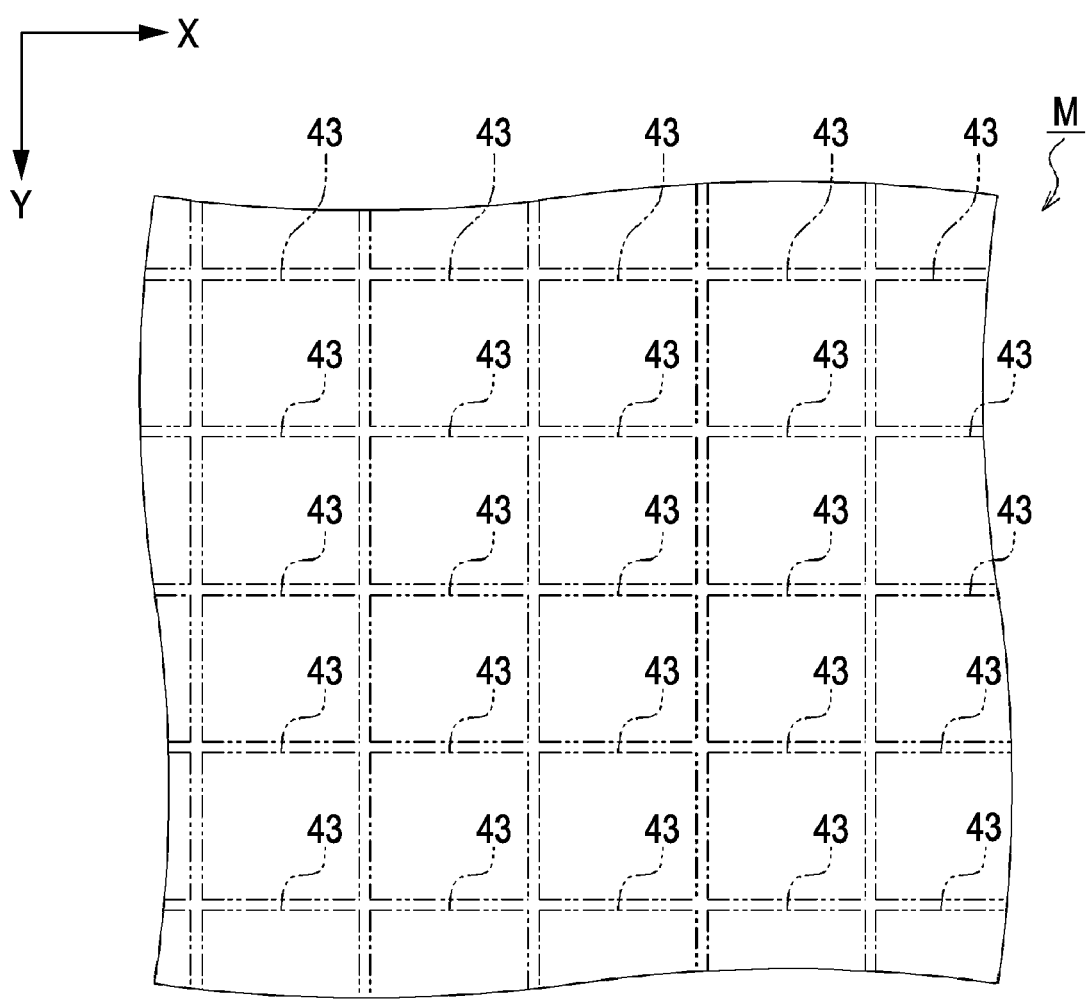
FIG. 5 is a plan view illustrating the arrangement of a plurality of pixel groups according to the embodiment.

Referring to FIG. 5, in the matrix M, the multiple pixel groups 43 are arranged both in the X-axis and Y-axis directions. In other words, the multiple pixel groups 43 are arranged in a matrix.

The driver-element substrate 15 and the counter substrate 17 included in the liquid crystal panel 11, and the barrier substrate 14 will be described below in detail.

Figure 6:
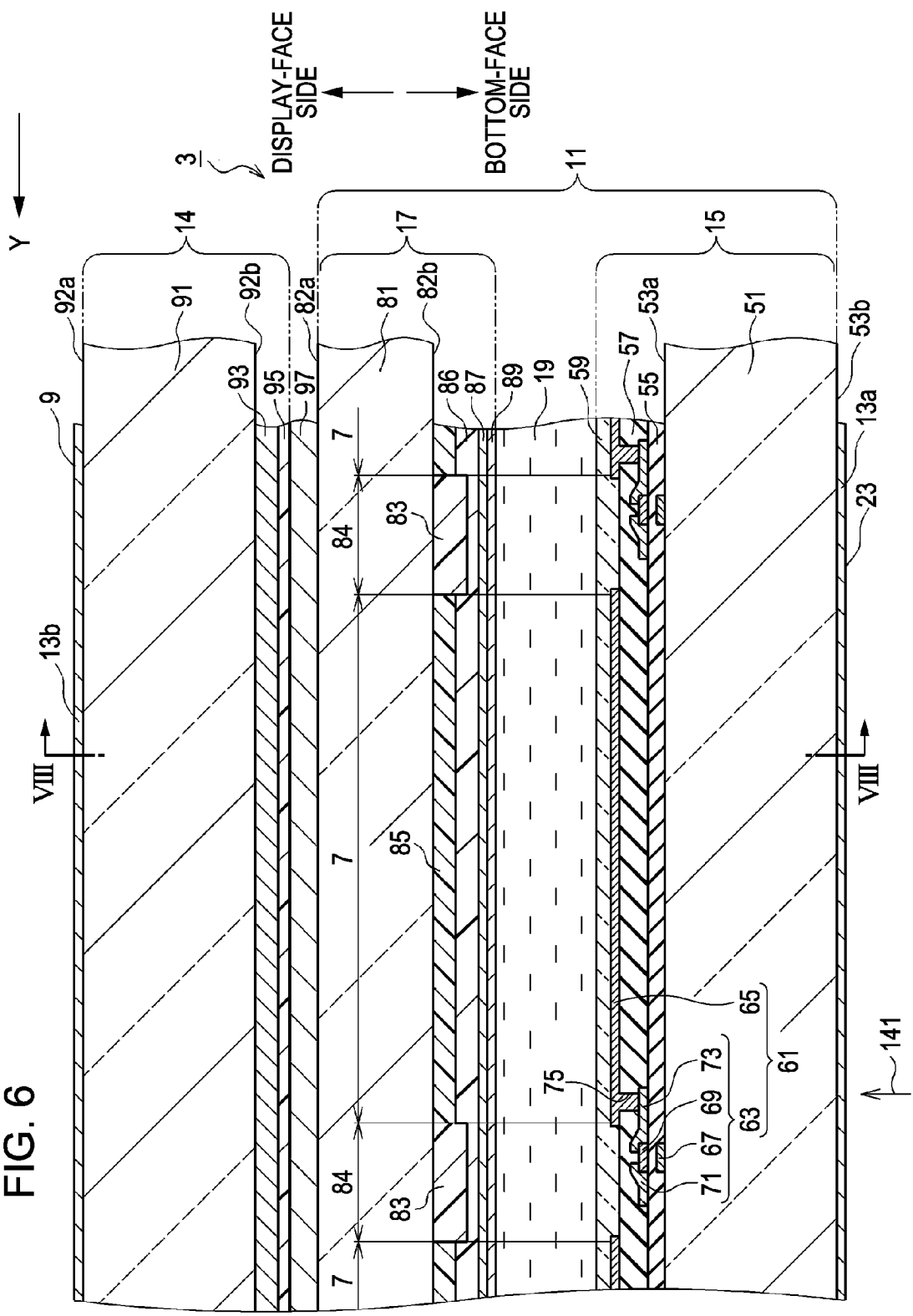
FIG. 6 is a cross-sectional view taken along line VI-VI in FIG. 4.

FIG. 6 is a cross-sectional view taken along line VI-VI in FIG. 4. As shown in FIG. 6, the driver-element substrate 15 includes a first substrate 51. The first substrate 51 is made of an optically transparent material such as glass, and has a first face 53a facing towards the display face 9 and a second face 53b facing towards the bottom face 23.

The first face 53a of the first substrate 51 has disposed thereon a gate insulation layer 55. An insulation layer 57 is disposed on the display face 9 side of the gate insulation layer 55. An alignment film 59 is disposed on the display face 9 side of the insulation layer 57.

The driver-element substrate 15 is provided with a driver element 61 for each pixel 7, the driver element 61 being disposed at the first face 53a side of the first substrate 51. The driver element 61 corresponding to each pixel 7 includes a thin film transistor (TFT) element 63, which is a type of a switching element, and a pixel electrode 65. The TFT element 63 includes a gate electrode 67, a semiconductor layer 69, a source electrode 71, and a drain electrode 73.

The gate electrode 67 is disposed on the first face 53a of the first substrate 51, and the display face 9 side of the gate electrode 67 is covered by the gate insulation layer 55. The gate electrode 67 may be made of, for example, a metallic material such as molybdenum, tungsten, or chromium, or of an alloy containing these materials. The gate insulation layer 55 may be made of, for example, an optically transparent material such as silicon oxide (SiO) or silicon nitride (SiN).

The semiconductor layer 69 is made of, for example, amorphous silicon and is positioned so as to face the gate electrode 67 across the gate insulation layer 55.

The source electrode 71 is disposed on the display face 9 side of the gate insulation layer 55 and partially overlies the semiconductor layer 69. The drain electrode 73 is disposed on the display face 9 side of the gate insulation layer 55 and partially overlies the semiconductor layer 69. The source electrode 71 and the drain electrode 73 may be made of, for example, a metallic material such as gold, silver, copper, or aluminum, or of an alloy containing these materials.

The TFT element 63 having the above-described configuration is of a so-called bottom gate type in which the semiconductor layer 69 is positioned among the gate electrode 67, the source electrode 71, and the drain electrode 73. The TFT element 63 has its display face 9 side covered by the insulation layer 57. The insulation layer 57 may be made of, for example, an optically transparent material such as SiO, SiN, or acrylic resin.

The pixel electrode 65 is made of, for example, an optically transparent material, such as an oxidized conductive film of indium tin oxide (ITO) or the like, or a film of metal such as magnesium (Mg) or silver (Ag) formed thin enough so as to have optical transparency. The pixel electrode 65 is disposed on the display face 9 side of the insulation layer 57 and is connected to the drain electrode 73 via a contact hole 75 provided in the insulation layer 57.

The alignment film 59 is made of an optically transparent material such as polyimide, and covers the insulation layer 57 and the pixel electrode 65 from the display face 9 side. The alignment film 59 is preliminarily given an alignment treatment.

The counter substrate 17 includes a second substrate 81. The second substrate 81 is made of an optically transparent material such as glass or quartz, and has an outer face 82a facing towards the display face 9 and a counter face 82b facing towards the bottom face 23.

The counter face 82b of the second substrate 81 is provided with a light absorption layer 83 that divides the display area 8 into pixels 7, the light absorption layer 83 extending over a region 84. In the display device 1, each pixel 7 can be defined as a region surrounded by the light absorption layer 83. The light absorption layer 83 is made of, for example, resin containing a highly light-absorptive material such as carbon black or chromium, and forms a lattice pattern in plan view.

The counter face 82b of the second substrate 81 has disposed thereon a color filter 85 that covers each region surrounded by the light absorption layer 83, i.e., the region defining each pixel 7, from the bottom face 23 side. Of the incident light, each color filter 85 is capable of transmitting light in a predetermined wave range. The color filters 85 are made of resin having different colors depending on the pixels 7r, pixels 7g, and pixels 7b. Specifically, a color filter 85 corresponding to a pixel 7r is capable of transmitting R light, a color filter 85 corresponding to a pixel 7g is capable of transmitting G light, and a color filter 85 corresponding to a pixel 7b is capable of transmitting B light. When differentiating R, G, and B colors among the color filters 85 in the description hereinafter, the terms "color filter 85r", "color filter 85g", and "color filter 85b" will be used.

The bottom face 23 side of the light absorption layer 83 and the color filters 85 is provided with an overcoat layer 86. The overcoat layer 86 is made of resin having optical transparency and covers the light absorption layer 83 and the color filters 85 from the bottom face 23 side.

A counter electrode 87 is provided on the bottom face 23 side of the overcoat layer 86. The counter electrode 87 is made of, for example, an optically transparent material, such as an oxidized conductive film of ITO or the like, or a film of metal such as Mg or Ag formed thin enough so as to have optical transparency.

The counter electrode 87 extends continuously over the plurality of pixels 7 forming the matrix M. In other words, the counter electrode 87 is disposed over an area that overlaps the plurality of pixels 7 forming the matrix M in plan view, and serves as a common electrode among the pixels 7. The counter electrode 87 is connected to a common line (not shown).

An alignment film 89 is disposed on the bottom face 23 side of the counter electrode 87. The alignment film 89 is made of an optically transparent material such as polyimide, and covers the counter electrode 87 from the bottom face 23 side. The alignment film 89 is preliminarily given an alignment treatment.

The liquid crystal 19 between the driver-element substrate 15 and the counter substrate 17 is specifically interposed between the alignment film 59 and the alignment film 89. In the display device 1, the seal member 25 shown in FIG. 2 is sandwiched between the first face 53a of the first substrate 51 and the counter face 82b of the second substrate 81 shown in FIG. 6. In other words, in the display device 1, the liquid crystal 19 is held by the first substrate 51 and the second substrate 81. Alternatively, the seal member 25 may be disposed between the alignment film 59 and the alignment film 89. In that case, the liquid crystal 19 can be regarded as being held by the driver-element substrate 15 and the counter substrate 17.

The barrier substrate 14 includes a third substrate 91. The third substrate 91 is made of an optically transparent material such as glass or quartz, and has an outer face 92a facing towards the display face 9 and a counter face 92b facing towards the bottom face 23.

The counter face 92b of the third substrate 91 has disposed thereon a light blocking layer 93. The light blocking layer 93 may be made of, for example, resin containing carbon black, etc. or a highly light-absorptive material such as chromium. The light blocking layer 93 extends over the plurality of pixels 7 forming the matrix M. In other words, the light blocking layer 93 is disposed over an area that overlaps the plurality of pixels 7 forming the matrix M in plan view.

An overcoat layer 95 is disposed on the bottom face 23 side of the light blocking layer 93. The overcoat layer 95 is made of, for example, an optically transparent material such as acrylic resin and covers the light blocking layer 93 from the bottom face 23 side.

The barrier substrate 14 having the above-described configuration has its overcoat layer 95 bonded to the outer face 82a of the second substrate 81 by means of an optically transparent adhesive 97 while the counter face 92b is faces the outer face 82a.

The aforementioned TFT element 63 is mostly disposed in the region 84 shown at the left side in FIG. 6, while the drain electrode 73 thereof extends from the region 84 into the region of the pixel 7. An edge of each pixel electrode 65 extends into the region 84 in plan view.

Figure 7:
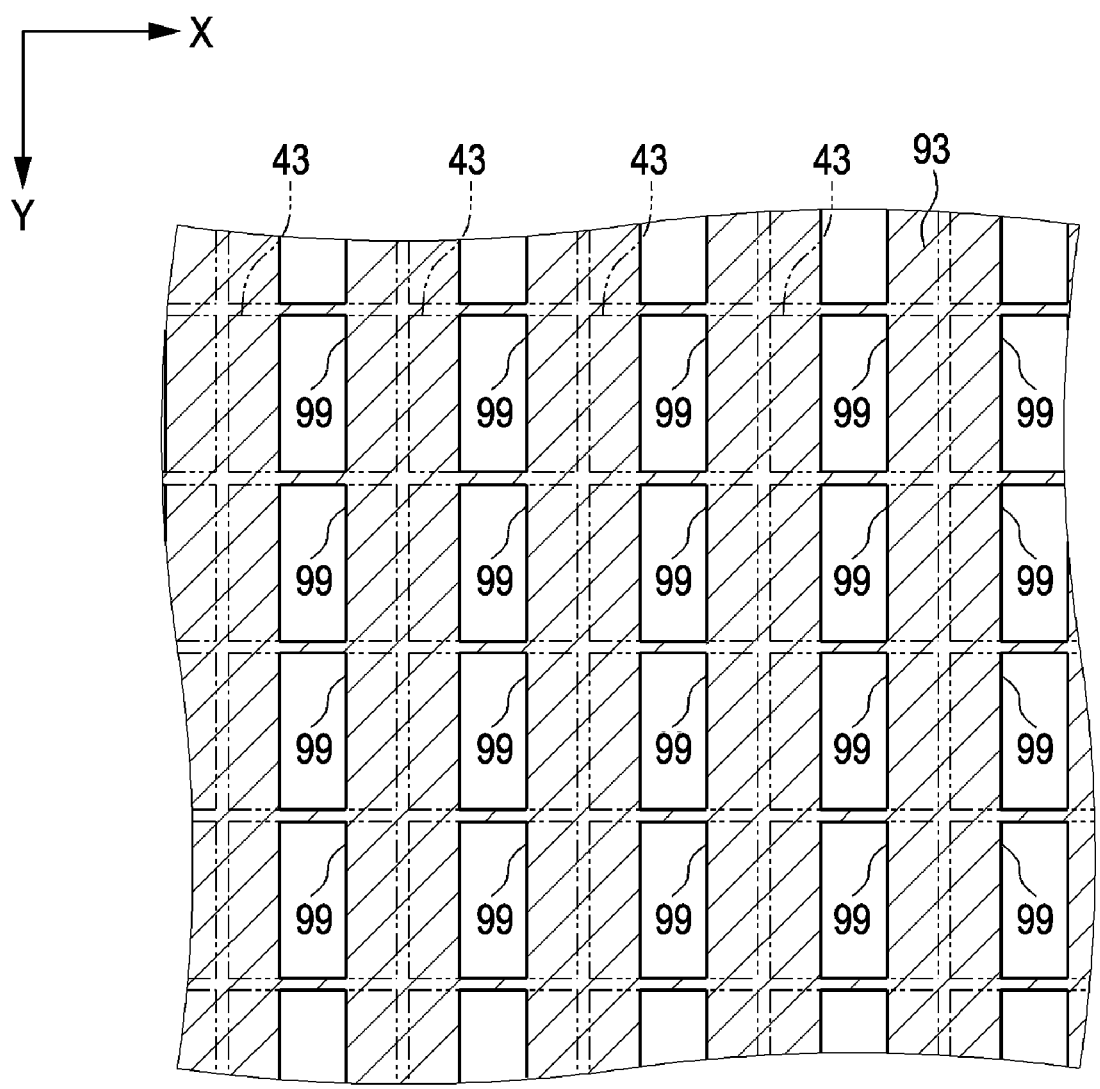
FIG. 7 is a plan view showing a light blocking layer and the pixel groups according to the embodiment.

FIG. 7 is a plan view of the light blocking layer 93 and the pixel groups 43. As shown in FIG. 7, the light blocking layer 93 has openings 99 provided in correspondence with the pixel groups 43. To provide a better understanding of the configuration, the light blocking layer 93 in FIG. 7 is shown in a hatched pattern.

Figure 8:
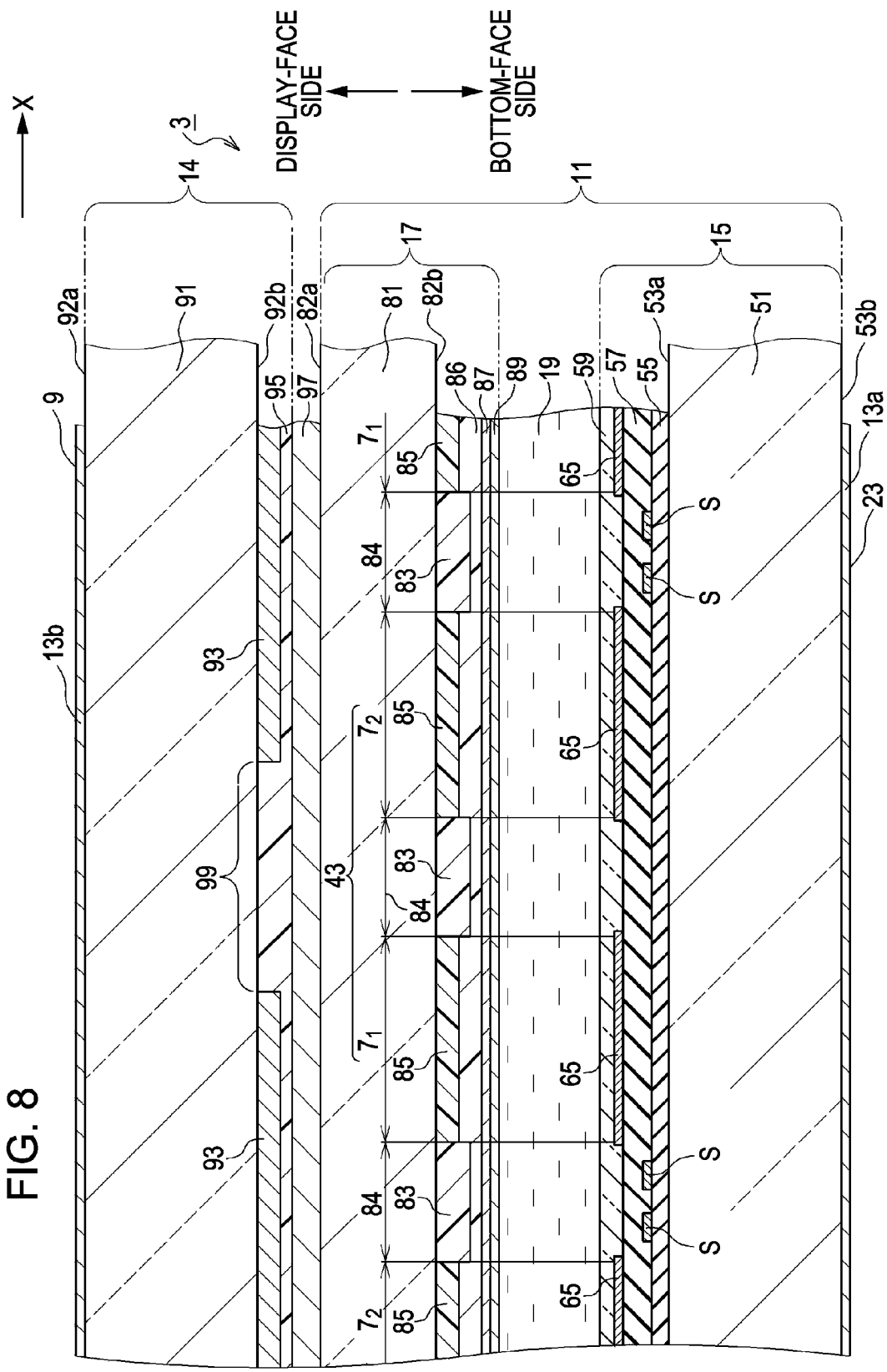
FIG. 8 is a cross-sectional view taken along line VIII-VIII in FIG. 6.

FIG. 8 is a cross-sectional view taken along line VIII-VIII in FIG. 6. As shown in FIG. 8, each opening 99 is formed in a region that overlaps both the first pixel $7_1$ and the second pixel $7_2$ of the corresponding pixel group 43 in plan view. The overcoat layer 95 extends within the opening 99, which means that the overcoat layer 95 covers the light blocking layer 93 and the counter face 92b of the third substrate 91 from the bottom face 23 side.

Referring to FIG. 8, the driver-element substrate 15 includes a plurality of source lines S. The source lines S are disposed on the gate insulation layer 55 and are covered by the insulation layer 57 from the display face 9 side.

Figure 9:
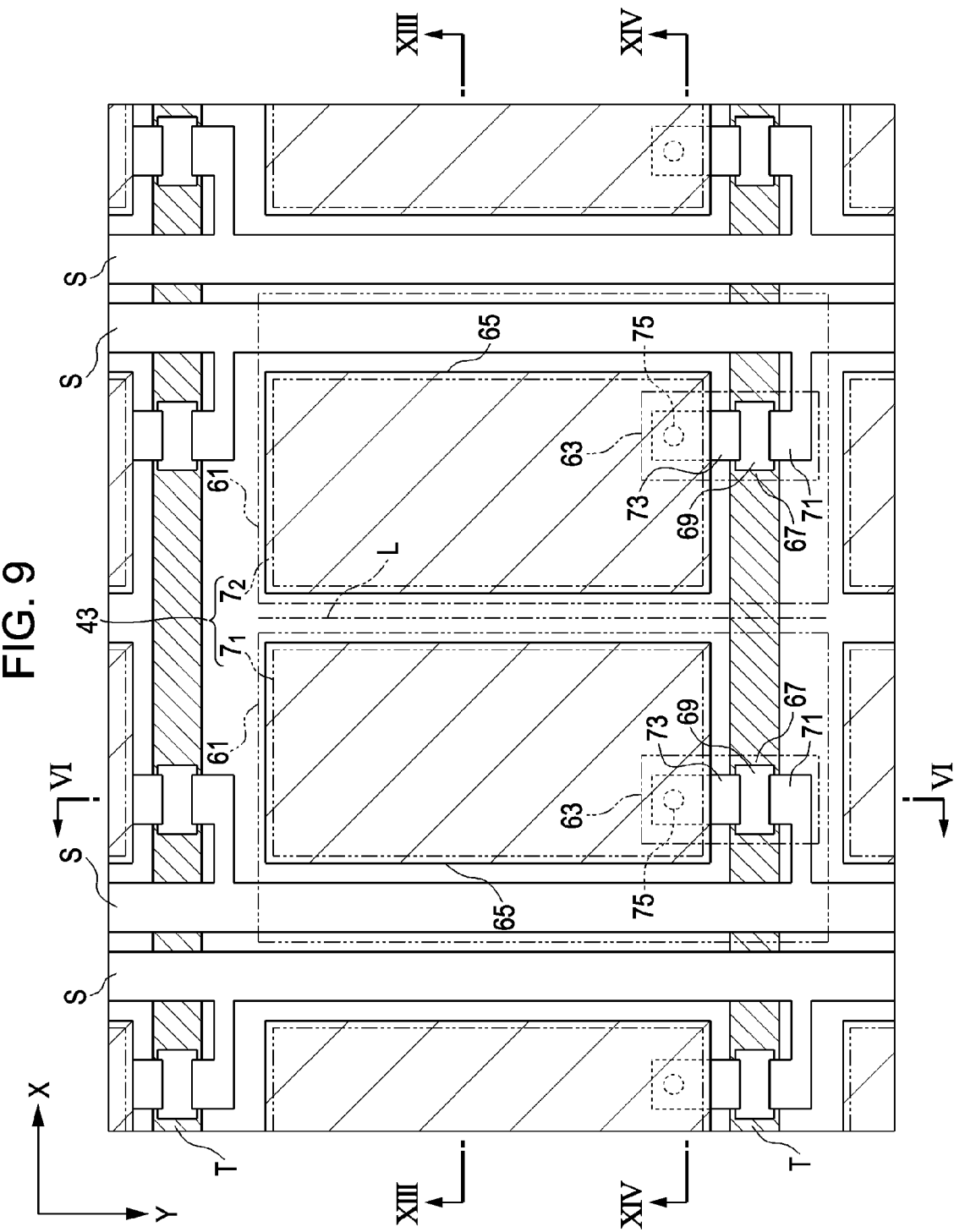
FIG. 9 is a plan view illustrating the disposition of TFT elements and pixel electrodes according to the embodiment.

FIG. 9 is a plan view showing the arrangement of TFT elements 63 and pixel electrodes 65. As shown in FIG. 9, the source electrodes 71 of TFT elements 63 adjacent to each other in the Y-axis direction are connected via a source line S. On the other hand, the gate electrodes 67 of TFT elements 63 adjacent to each other in the X-axis direction are connected via a gate line T. To provide a better understanding of the configuration, the gate lines T and the pixel electrodes 65 in FIG. 9 are shown in hatched patterns.

The gate electrodes 67 are provided as gate lines T extending continuously among pixels 7 arranged in the X-axis direction. For each pixel 7, a semiconductor layer 69 is provided at a position facing the corresponding gate line T. On each gate line T, a region that overlaps a semiconductor layer 69 can be defined as a gate electrode 67.

The cross section of the driver element 61 in FIG. 6 corresponds to a cross section taken along line VI-VI in FIG. 9.

Figure 10:
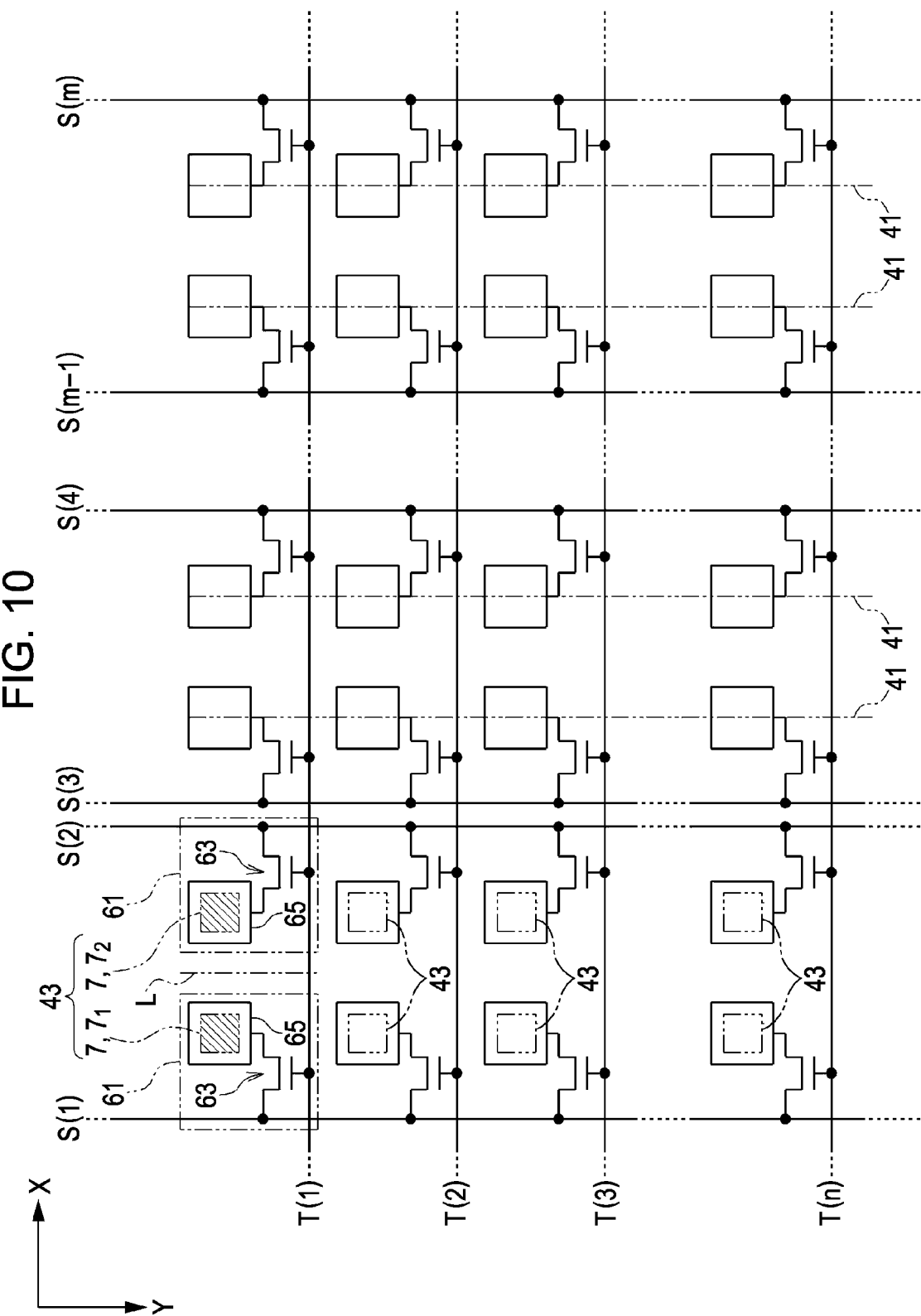
FIG. 10 is an equivalent circuit diagram of the plurality of pixels in the display device according to the embodiment.

Referring to FIG. 10, the driver-element substrate 15 in the display device 1 has n gate lines T (n being an integer of 2 or greater) and m source lines S (m being an integer of 2 or greater). When differentiating the n gate lines T from each other and the m source lines S from each other, the terms "gate line T(n)" and "source line S(m)" will respectively be used hereinafter.

The n gate lines T and the m source lines S are wired to form a lattice pattern. The n gate lines T extend in the X-axis direction while being spaced apart from each other in the Y-axis direction by a predetermined distance. The m source lines S extend in the Y-axis direction while being spaced apart from each other in the X-axis direction by a predetermined distance. The pixels 7 are set in correspondence to intersections between the gate lines T and the source lines S.

Each source line S corresponds to an array of pixels 7 arranged in the Y-axis direction, i.e., one pixel column 41. Each gate line T corresponds to an array of pixels 7 arranged in the X-axis direction, i.e. one pixel row 42.

Figure 11:
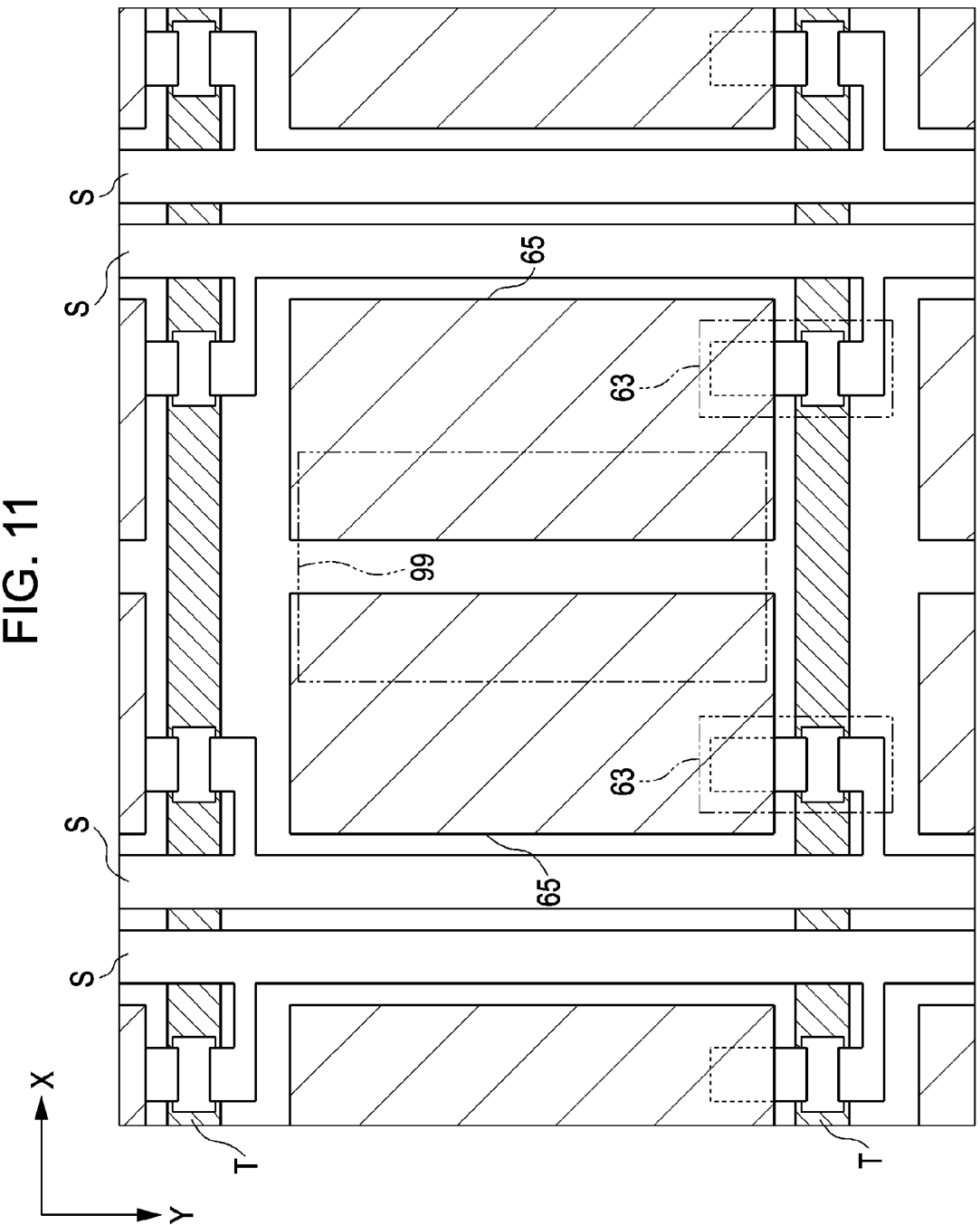
FIG. 11 is a plan view illustrating the disposition of the TFT elements and the pixel electrodes according to the embodiment.

Referring to FIGS. 9 and 10, in each pixel group 43, the driver element 61 corresponding to the first pixel $7_1$ and the driver element 61 corresponding to the second pixel $7_2$ are disposed symmetrically to each other. Specifically, these neighboring driver elements 61 are positioned symmetrically with respect to an imaginary line L extending between the first pixel $7_1$ and the second pixel $7_2$. Referring to FIG. 11, the TFT elements 63 respectively corresponding to the first pixel $7_1$ and the second pixel $7_2$ in each pixel group 43 are disposed outside the border of the corresponding opening 99 in the light blocking layer 93 in plan view.

The display device 1 having the above-described configuration controls the display operation by varying the alignment condition of the liquid crystal 19 among the pixels 7 while light is emitted to the display panel 3 from the illuminating unit 5. The alignment condition of the liquid crystal 19 can be changed by switching the TFT elements 63 between off and on modes.

FIG. 12A illustrates a polarization state when a TFT element 63 is switched to an off mode. FIG. 12B illustrates a polarization state when a TFT element 63 is switched to an on mode.

As shown in FIGS. 12A and 12B, in the display device 1, a direction 111 in which the transmission axis of the polarizing plate 13a extends is, in plan view, orthogonal to a direction 113 in which the transmission axis of the polarizing plate 13b extends. An alignment direction 115 of the alignment film 59 is orthogonal to the transmission-axis direction 113 in plan view. An alignment direction 117 of the alignment film 89 extends along the transmission-axis direction 113 in plan view.

In FIGS. 12A and 12B, an X'-axis direction indicates a direction extending along the transmission-axis direction 113 of the polarizing plate 13b in plan view, and a Y'-axis direction indicates a direction orthogonal to the X'-axis direction on an X-Y plane. The X'-axis direction and Y'-axis direction are two arbitrary directions that are orthogonal to each other on the X-Y plane.

Light entering the polarizing plate 13a from the illuminating unit 5 becomes incident on the liquid crystal 19 as linearly polarized light 119 having a polarization axis extending along the transmission-axis direction 111 of the polarizing plate 13a, i.e., the Y'-axis direction.

As shown in FIG. 12A, when the TFT element 63 is in an off mode, the linearly polarized light 119 incident on the liquid crystal 19 is emitted towards the polarizing plate 13b as linearly polarized light 121 having a polarization axis extending along the X'-axis direction due to the optical activity of the liquid crystal 19. The linearly polarized light 121 emitted towards the polarizing plate 13b is able to pass through the polarizing plate 13b since the polarization axis of the linearly polarized light 121 extends along the transmission-axis direction 113 of the polarizing plate 13b.

On the other hand, as shown in FIG. 12B, when the TFT element 63 is in an on mode, the linearly polarized light 119 with its polarization state still maintained is emitted towards the polarizing plate 13b. The linearly polarized light 119 emitted towards the polarizing plate 13b becomes absorbed by the polarizing plate 13b since the polarization axis of the linearly polarized light 119 is orthogonal to the transmission-axis direction 113 of the polarizing plate 13b.

In the display device 1, a display mode of a so-called normally white type is employed, in which light is emitted from the display face 9 when the TFT elements 63 are switched off whereas light from the display face 9 is blocked when the TFT elements 63 are switched on. Alternatively, the display mode is not limited to such a normally white type, and may be of a normally black type.

As mentioned above, the display device 1 includes a light blocking layer 93 having openings 99 provided in correspondence to the pixel groups 43. The light entering each pixel 7 from the illuminating unit 5 is emitted towards the display face 9 through the corresponding opening 99.

In this case, a light beam 123a emitted from each first pixel $7_1$ towards the display face 9 covers a first range 125 through the corresponding opening 99 as shown in FIG. 13. Specifically, FIG. 13 is a cross-sectional view schematically showing the multiple pixel groups 43 and the light blocking layer 93.

Likewise, a light beam 123b emitted from each second pixel $7_2$ towards the display face 9 covers a second range 127 through the corresponding opening 99. The cross-sectional view in FIG. 13 corresponds to a cross section taken along line XIII-XIII in FIG. 9.

From the first range 125, the light beams 123a from the first pixels $7_1$ are visible through the openings 99. From the second range 127, the light beams 123b from the second pixels $7_2$ are visible through the openings 99. If the visual point is within the first range 125, a first image formed by the light beams 123a from the first pixels $7_1$ is visible. If the visual point is within the second range 127, a second image formed by the light beams 123b from the second pixels $7_2$ is visible. In other words, the display device 1 is capable of performing so-called directional display in which a first image can be displayed in the first range 125 and a second image can be displayed in the second range 127 that is different from the first range 125.

The first range 125 and the second range 127 overlap each other, and this overlapping range is referred to as a range 129. From this range 129, the first image and the second image would appear in a superposed state. From a range 131a (referred to as an "effective visible range 131a" hereinafter) which is obtained by excluding the range 129 from the first range 125, only the first image is visible. From a range 131b (referred to as an "effective visible range 131b" hereinafter) which is obtained by excluding the range 129 from the second range 127, only the second image is visible.

The display device 1 is configured such that the light beams 123a from the first pixels $7_1$ intersect at the opposite ends of the first range 125 and that the light beams 123b from the second pixels $7_2$ intersect at the opposite ends of the second range 127. This can be realized by setting the pitch Pa of the openings 99 adjoining each other in the X-axis direction shorter than the pitch Pb of the pixel groups 43 adjoining each other in the X-axis direction.

Consequently, the quantity of light visible from an arbitrary visual point within the effective visible range 131a can be made uniform among the first pixels $7_1$. Likewise, the quantity of light visible from an arbitrary visual point within the effective visible range 131b can be made uniform among the second pixels $7_2$.

Referring to FIG. 6, a light beam 141 emitted towards the liquid crystal panel 11 from the illuminating unit 5 passes through the driver-element substrate 15 so as to enter the liquid crystal 19. In this case, a portion of the light beam 141 is prevented from entering the liquid crystal 19 by being blocked by the gate electrodes 67 (gate lines T), the TFT elements 63, the source lines S, and the like. In other words, regions overlapping the gate electrodes 67, the gate lines T, the TFT elements 63, the source lines S, and the like act as light-blocking regions.

Of these light blocking regions, the light blocking regions formed by the drain electrodes 73 (referred to as "drain light-blocking regions" hereinafter) extend into the regions of the pixels 7. In other words, in each pixel 7, the drain light-blocking region partially intercepts light to be emitted towards the display face 9. Therefore, a portion of the light beam 141 that reaches the drain light-blocking region does not contribute to display.

Figure 14:
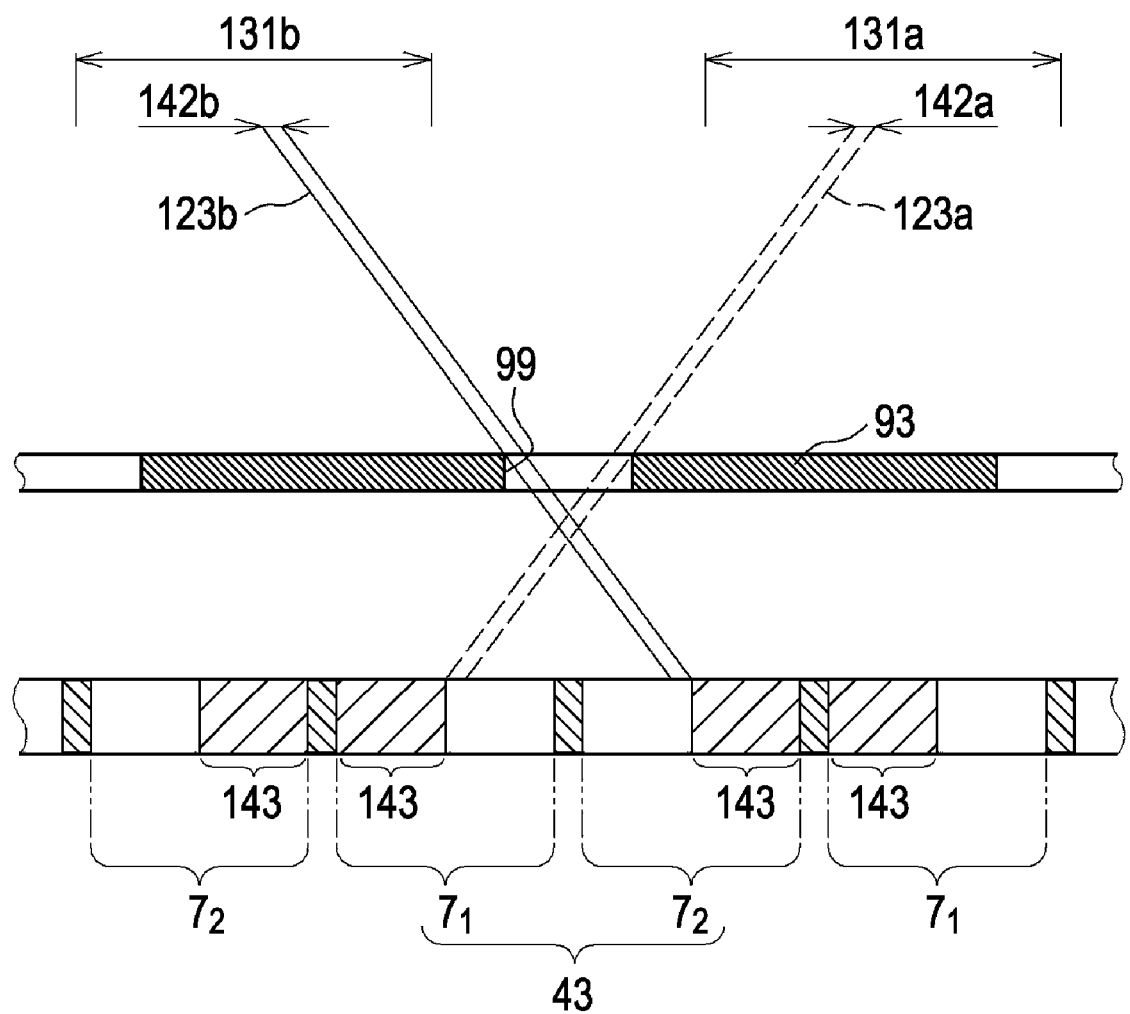
FIG. 14 is a cross-sectional view taken along line XIV-XIV in FIG. 9.

FIG. 14 is a cross-sectional view taken along line XIV-XIV in FIG. 9 and shows ranges 142a and 142b respectively covered by the light beams 123a and 123b emitted from the first and second pixels $7_1$ and $7_2$ towards the display face 9 through one of the openings 99 in the light blocking layer 93. As shown in FIG. 14, the ranges 142a and 142b are dimensionally reduced by drain light-blocking regions 143.

As mentioned above, in the display device 1, the gate electrodes 67, the gate lines T, the TFT elements 63, the source lines S, and the like are disposed symmetrically with respect to the imaginary line L. In other words, the light-blocking regions are positioned symmetrically with respect to the imaginary line L. Therefore, the range 142a and the range 142b can readily be made substantially identical to each other. Accordingly, the image brightness can be made uniform more readily between the first image and the second image in directional display.

In other words, in each pixel group 43 of the display device 1, the quantities of light beams 123a and 123b respectively emitted from the first and second pixels $7_1$ and $7_2$ towards the display face 9 through the corresponding opening 99 can be made symmetrical to each other more readily. The present inventor has found that, when the light beams 123a and 123b respectively emitted from the first and second pixels $7_1$ and $7_2$ toward the display face 9 through the corresponding opening 99 differ from each other in quantity, a difference in contrast ratio tends to occur between the first and second pixels $7_1$ and $7_2$. This is believed to be caused when diffraction phenomena in the light beams 123a and 123b owing to the light blocking layer 93 occur asymmetrically between the first and second pixels $7_1$ and $7_2$.

As mentioned above, in the display device 1, the quantities of light beams 123a and 123b respectively emitted from the first and second pixels $7_1$ and $7_2$ toward the display face 9 through the corresponding opening 99 can be made symmetrical to each other more readily. As a result, the contrast ratios can be made symmetrical more readily between the first pixel $7_1$ and the second pixel $7_2$. This contributes to a higher display quality in directional display.

In the display device 1, the light blocking layer 93 corresponds to a light blocking element.

Figure 15:
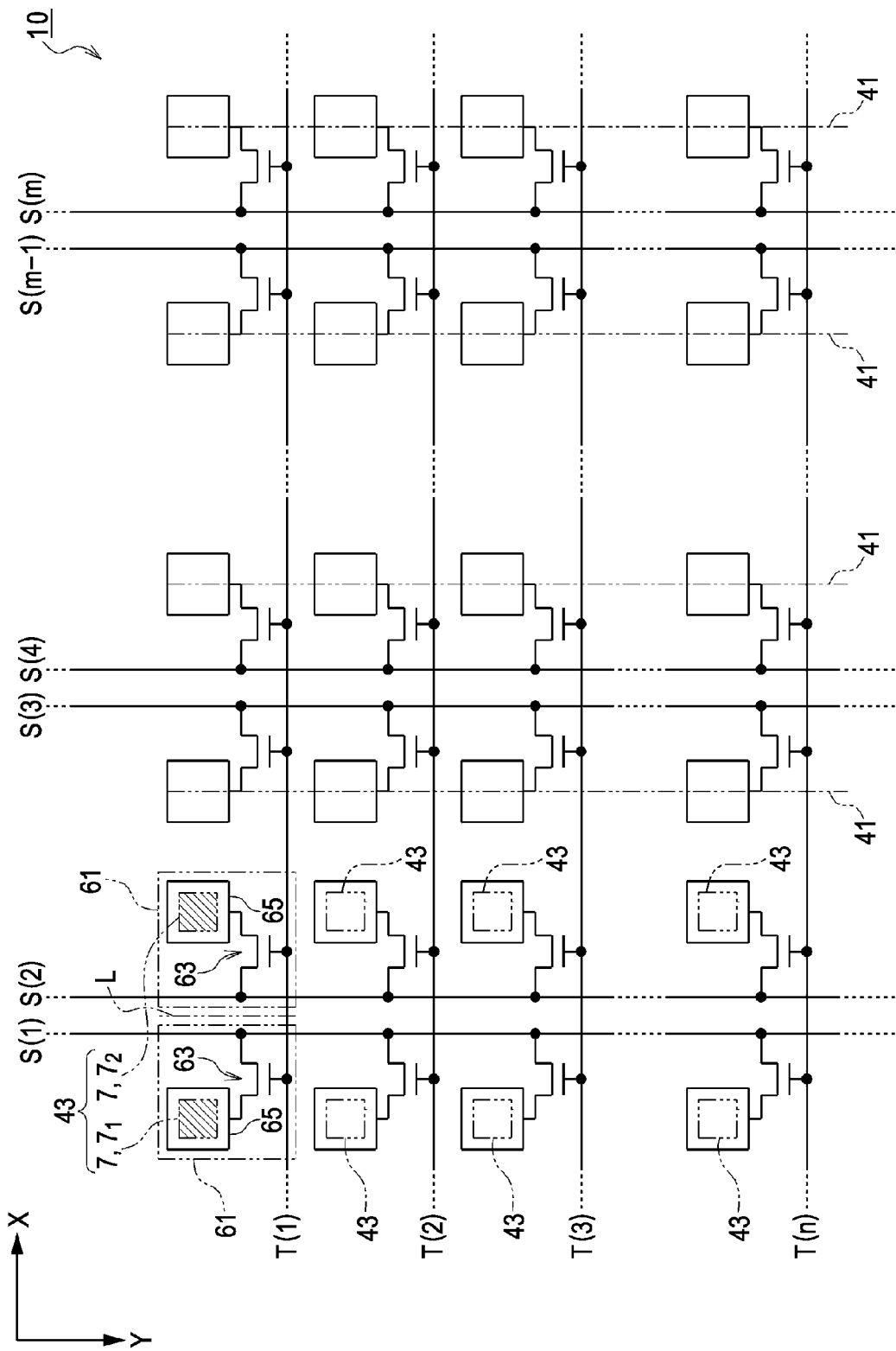
FIG. 15 is an equivalent circuit diagram of a plurality of pixels in a display device according to an alternative embodiment.

Although the display device 1 has source lines S wired between the pixel groups 43 adjacent to each other in the X-axis direction (FIG. 10), the source lines S are not limited to this wiring configuration. As shown in FIG. 15, the source lines S may alternatively be wired between the first pixels $7_1$ and the second pixels $7_2$ of the pixel groups 43.

In a display device 10 having source lines S wired between the first pixels $7_1$ and the second pixels $7_2$ of the pixel groups 43, source light-blocking regions are formed by the source lines S extending between the first pixels $7_1$ and the second pixels $7_2$ of the pixel groups 43.

Figure 16:
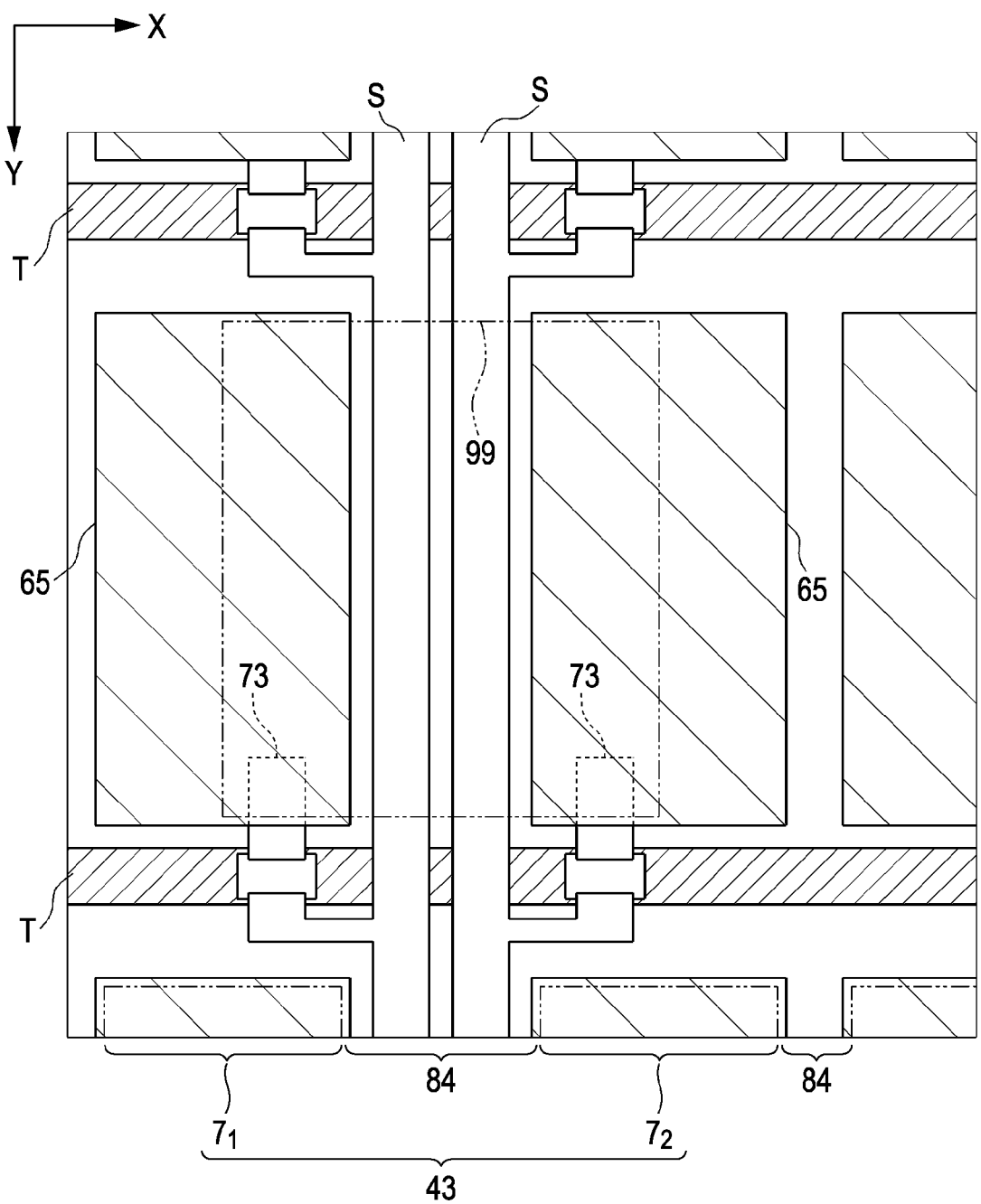
FIG. 16 is a plan view illustrating the disposition of the TFT elements and the pixel electrodes in the display device according to the alternative embodiment.

By disposing the light absorption layer 83 (FIG. 8) such that it overlaps the source light-blocking regions in plan view, the region 84 can be formed between each pair of first and second pixels $7_1$ and $7_2$ as shown in FIG. 16. Thus, the region 84 between the first and second pixels $7_1$ and $7_2$ can be made wider than in the case where the region 84 is formed between the pixel groups 43 adjacent to each other in the X-axis direction. Increasing the width of the region 84 between the first and second pixels $7_1$ and $7_2$ can reduce the range 129 (FIG. 13), which is the superposed range of the first image and the second image.

Figure 17:
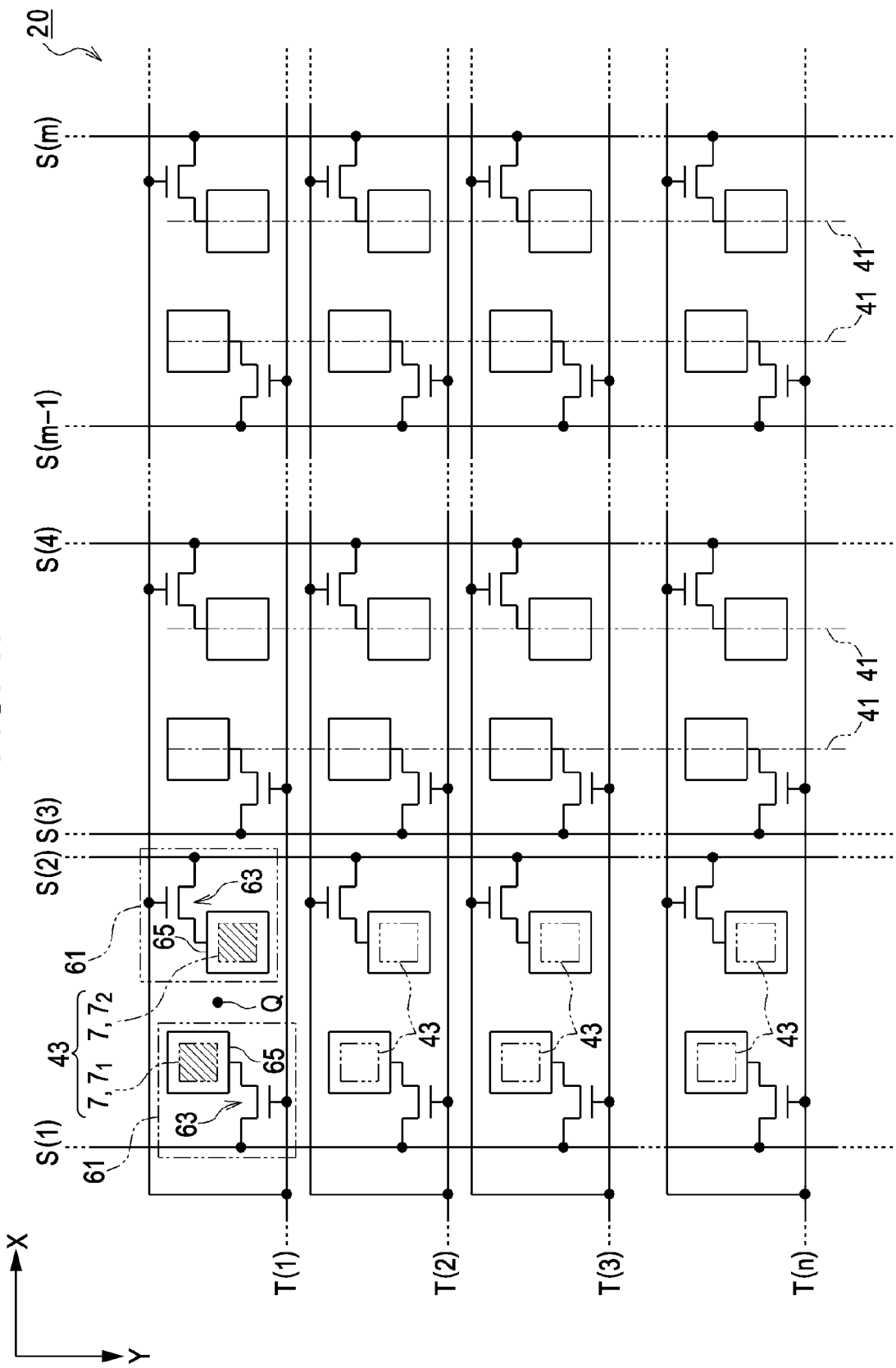
FIG. 17 is an equivalent circuit diagram of a plurality of pixels in a display device according to another alternative embodiment.
Figure 18:
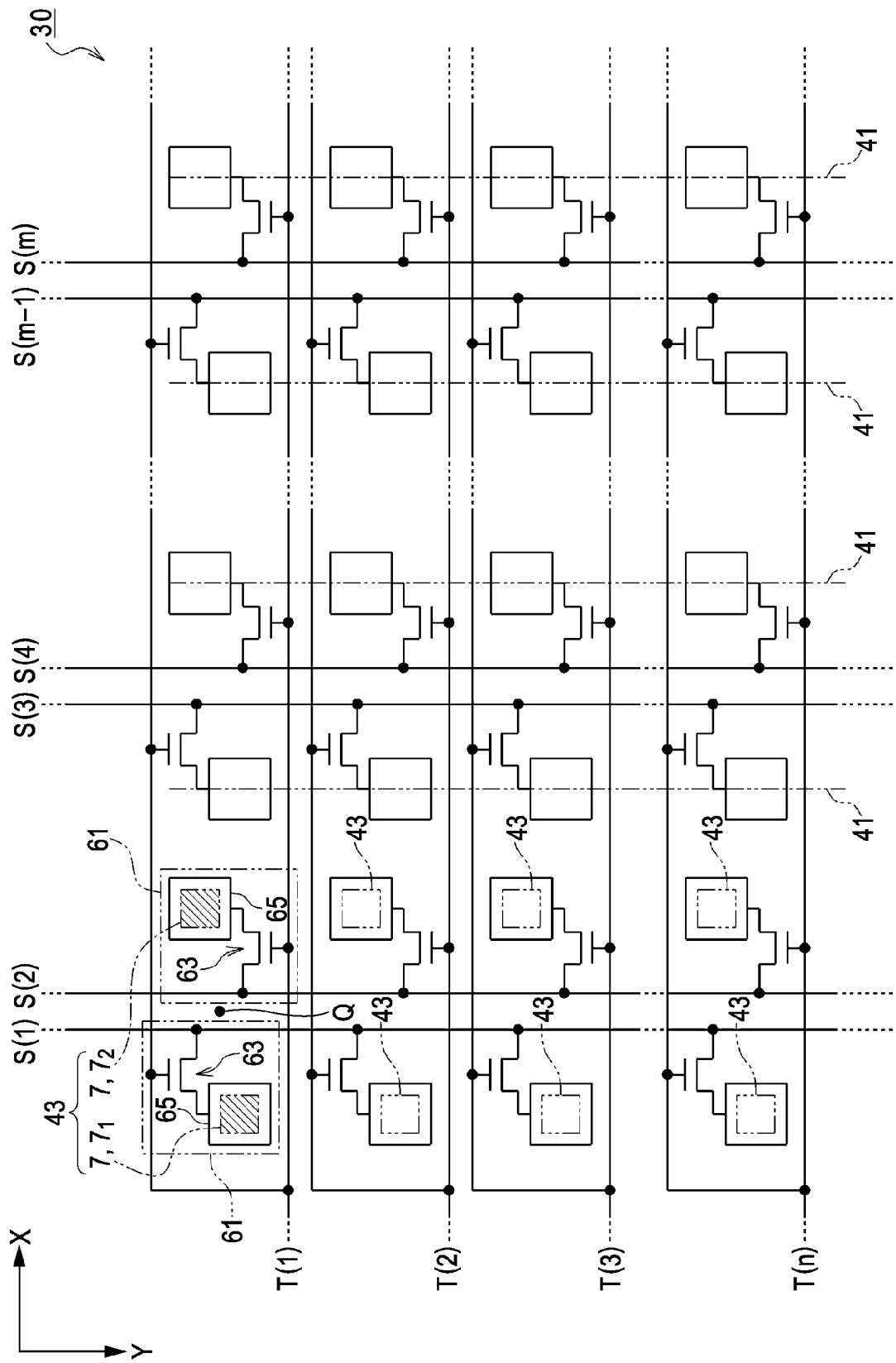
FIG. 18 is an equivalent circuit diagram of a plurality of pixels in a display device according to yet another alternative embodiment.

In the display device 1 and the display device 10, the driver elements 61 in the first pixel $7_1$ and the second pixel $7_2$ in each pixel group 43 are disposed symmetrically with respect to a line. However, the driver elements 61 are not limited to this configuration. As shown in FIGS. 17 and 18, the driver elements 61 in the first pixel $7_1$ and the second pixel $7_2$ in each pixel group 43 may be symmetrical about an imaginary point Q located between the first pixel $7_1$ and the second pixel $7_2$. In a display device 20 and a display device 30 in which the driver elements 61 in the first pixel $7_1$ and the second pixel $7_2$ in each pixel group 43 are symmetrical about the imaginary point Q between the first pixel $7_1$ and the second pixel $7_2$, the same advantages as in the display device 1 and the display device 10 can be achieved.

Figure 19:
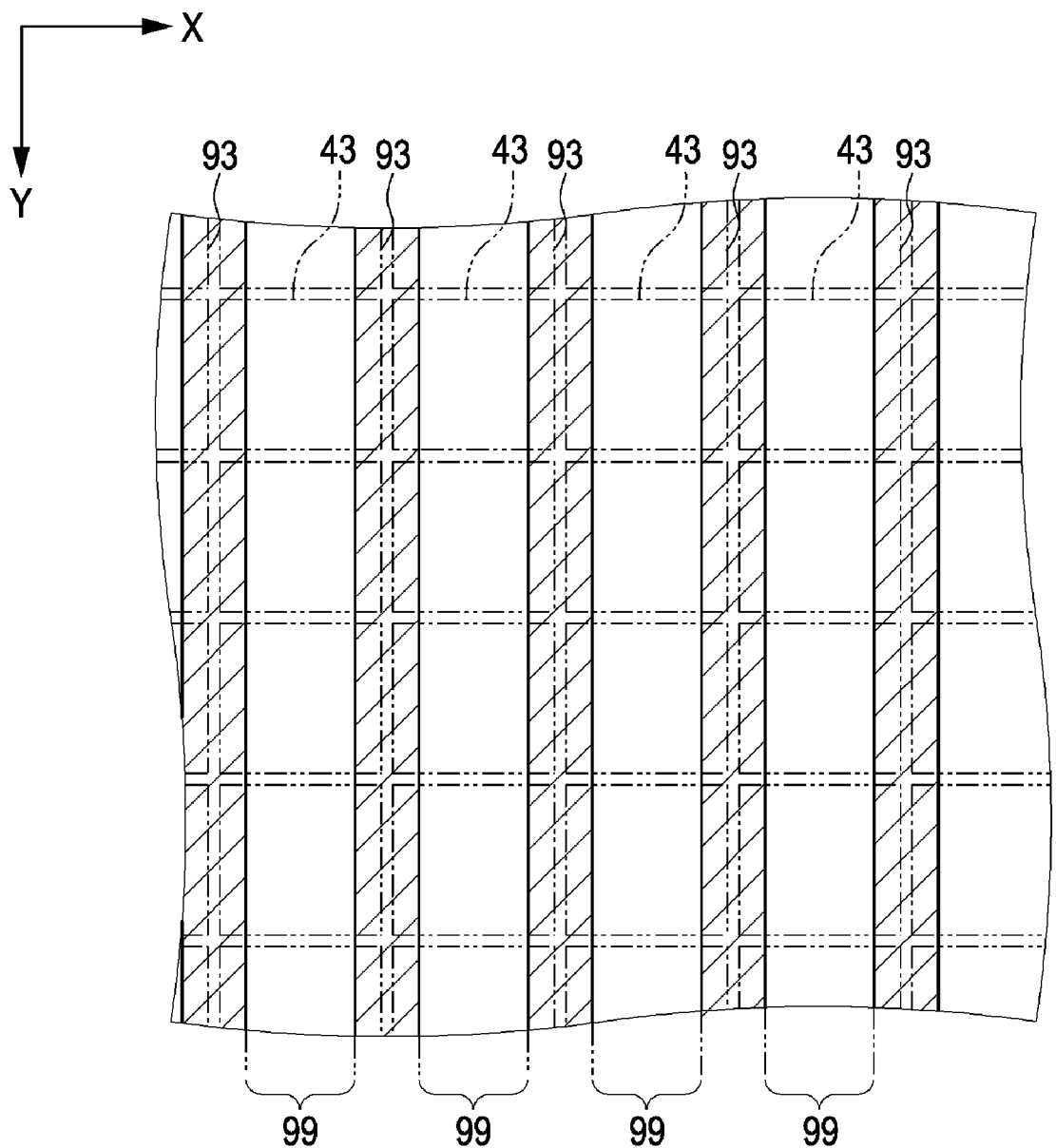
FIG. 19 is a plan view showing another example of the light blocking layer in the embodiment.

In each of the display devices 1, 10, 20, and 30, the light blocking layer 93 has an opening 99 in correspondence to each of the pixel groups 43 as shown in FIG. 7. However, the light blocking layer 93 is not limited to this configuration. As shown in FIG. 19 in plan view, the light blocking layer 93 may alternatively include light-blocking layer segments 93 provided in correspondence to spaces between the pixel groups 43 adjacent to each other in the X-axis direction so as to extend between the arrays of pixel groups 43 arranged in the Y-axis direction. In that case, the openings 99 each extend along the arrays of pixel groups 43 arranged in the Y-axis direction.

Figure 20:
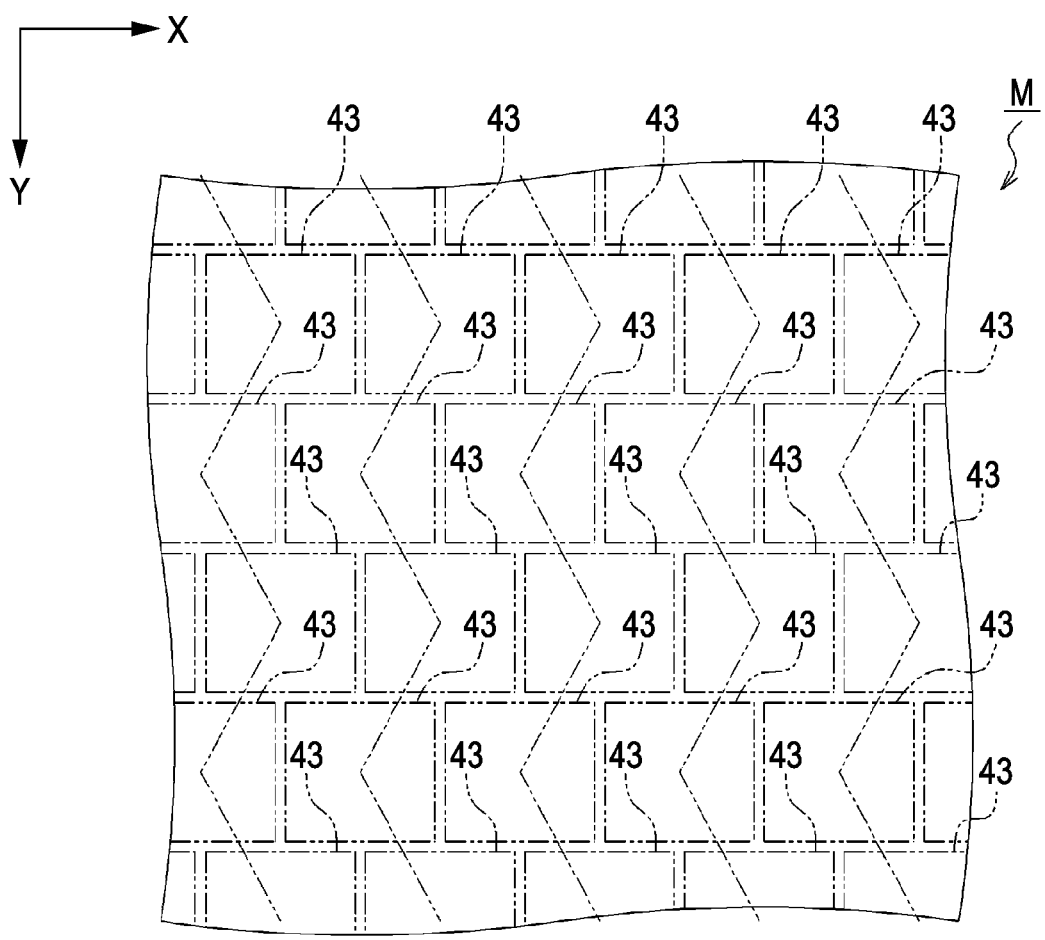
FIG. 20 is a plan view showing another example of the arrangement of the pixel groups in the embodiment.

In each of the display devices 1, 10, 20, and 30, the pixel groups 43 are arranged in the X-axis and Y-axis directions so as to form a matrix as shown in FIG. 5. However, the pixel groups 43 are not limited to this arrangement. Alternatively, for example, the pixel groups 43 may be arranged in a zigzag pattern in the Y-axis direction as shown in FIG. 20. In the case of this arrangement shown in FIG. 20, the first pixels $7_1$ and the second pixels $7_2$ shown in FIG. 4 are alternately arranged in the X-axis direction as well as in the Y-axis direction.

Figure 21:
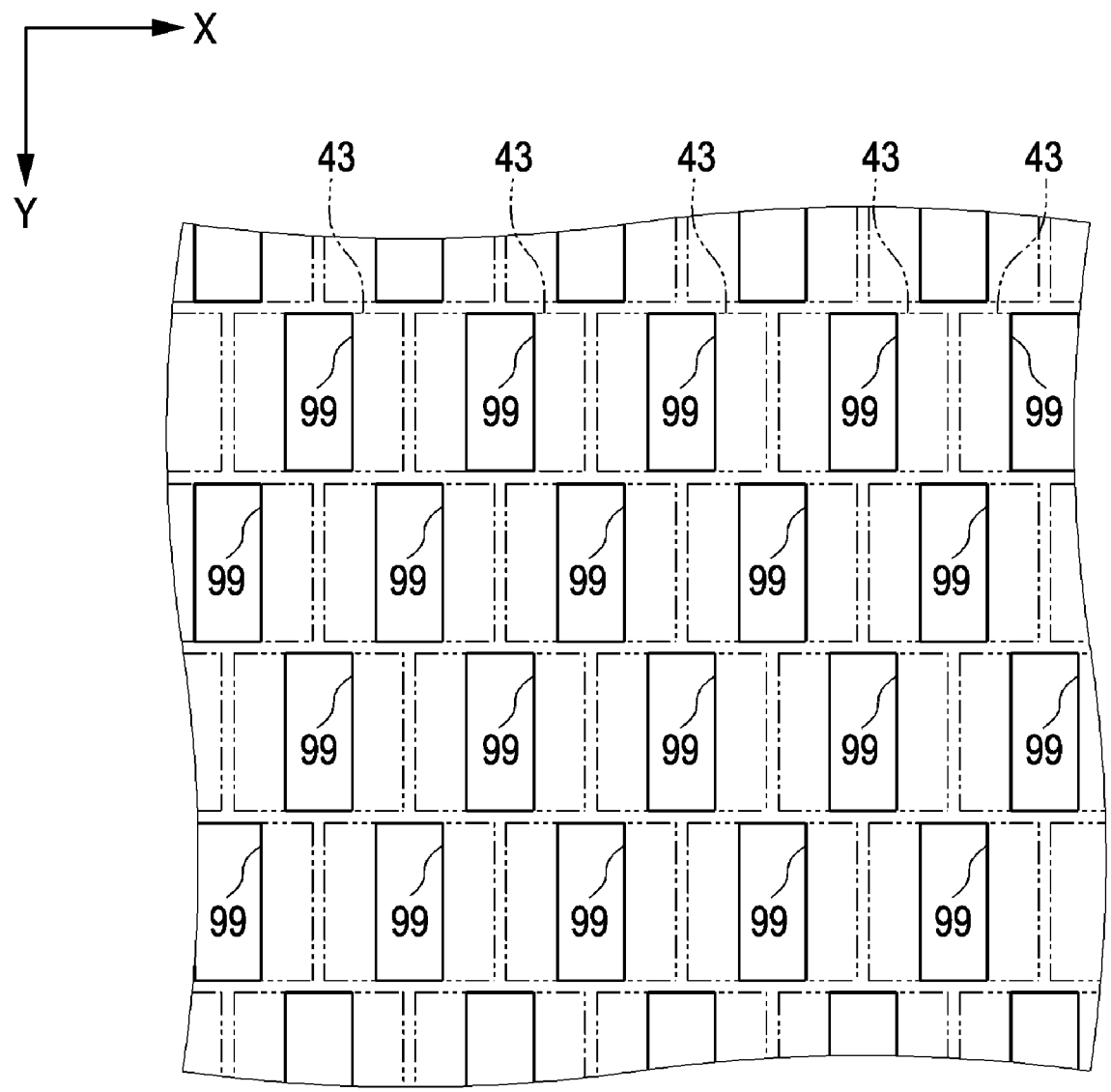
FIG. 21 is a plan view showing another example of the light blocking layer in the embodiment.
Figure 22:
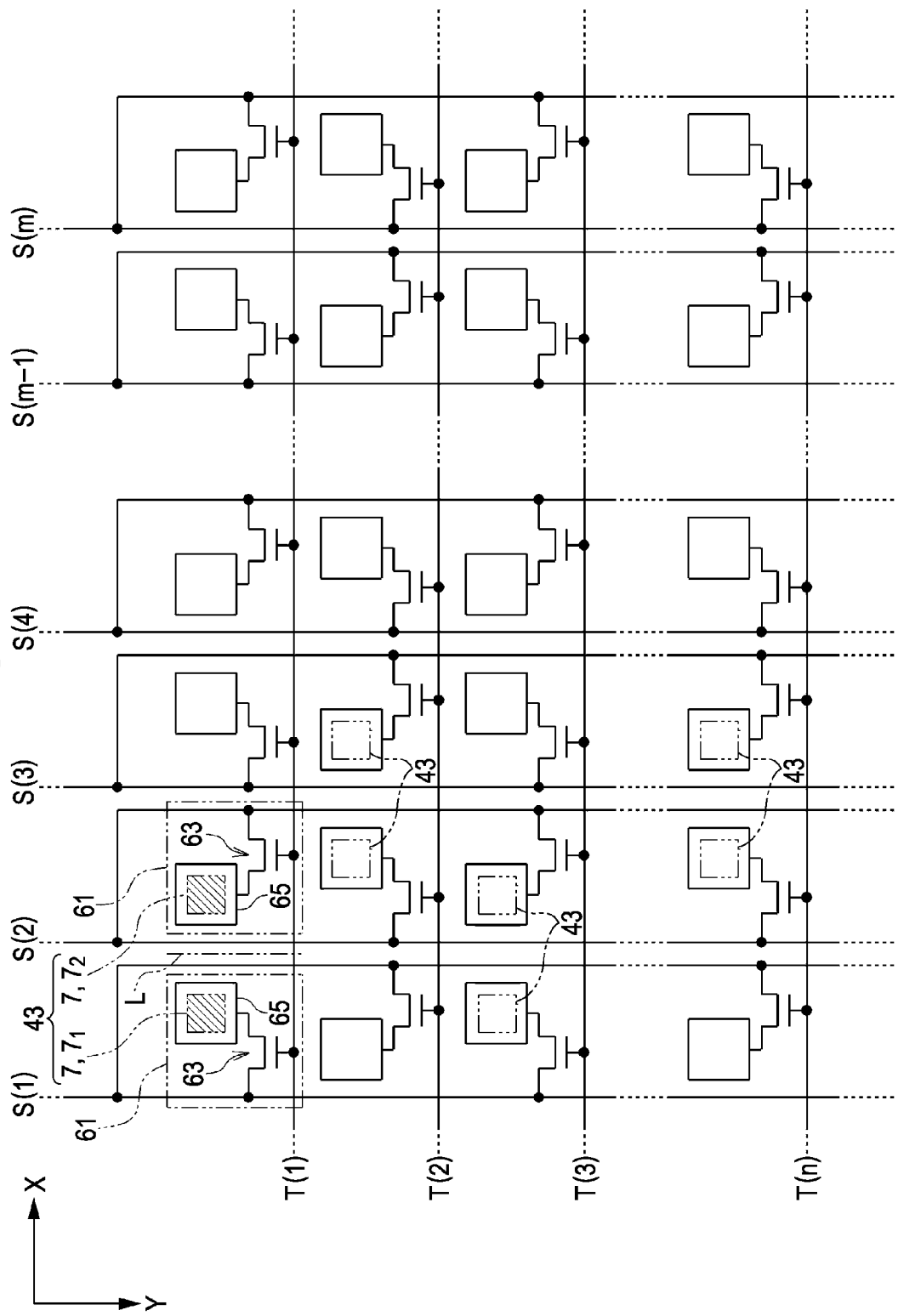
FIG. 22 is an equivalent circuit diagram of a plurality of pixels in a display device according to another alternative embodiment.
Figure 23:
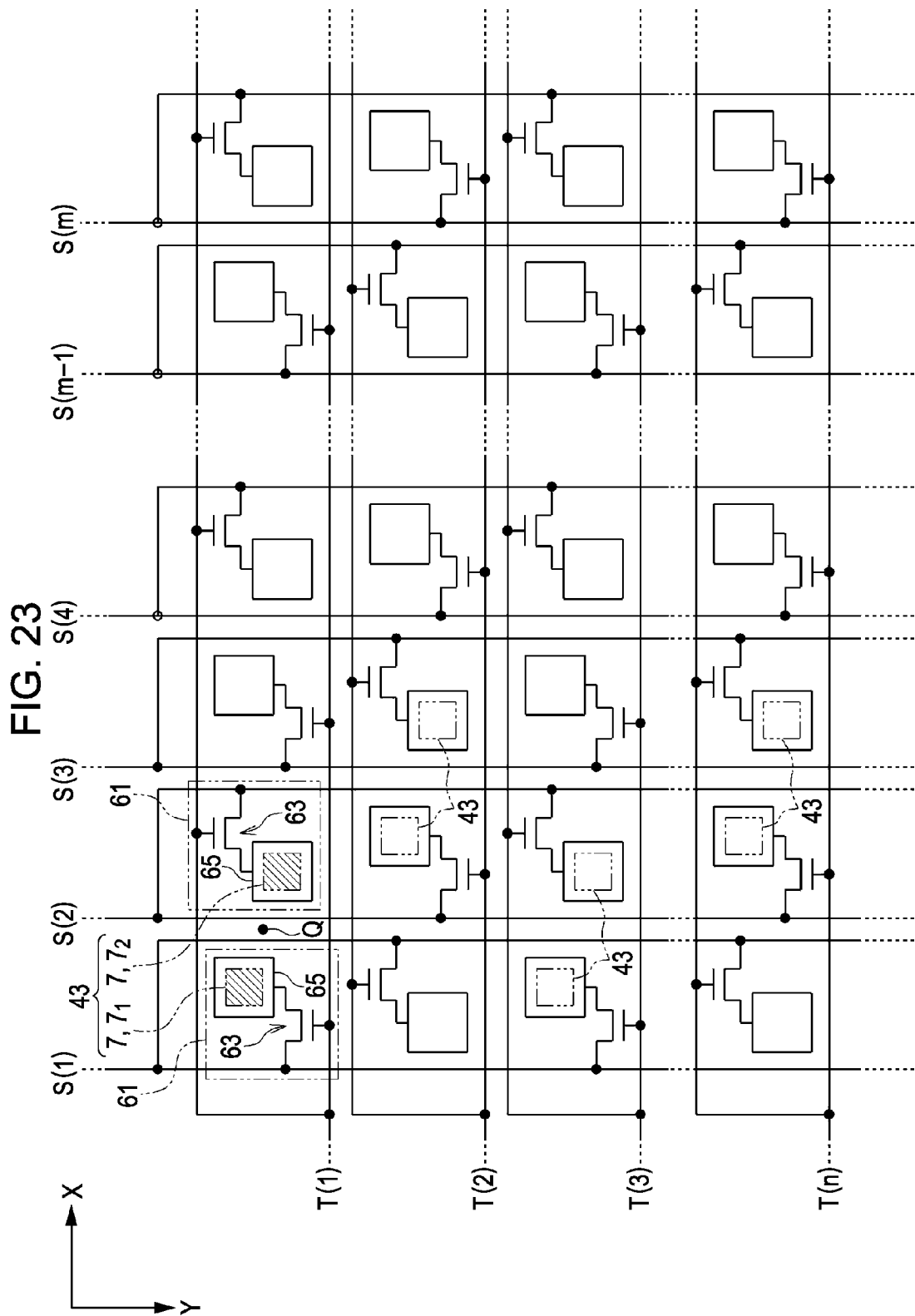
FIG. 23 is an equivalent circuit diagram of a plurality of pixels in a display device according to yet another alternative embodiment.

In this case, in each of the display devices 1, 10, 20, and 30, the light blocking layer 93 is provided with an opening 99 for each of the pixel groups 43 as shown in FIG. 21. Furthermore, as shown in FIGS. 22 and 23, it is preferable that the positions of the two driver elements 61 corresponding to each pixel group 43 be consistent in the corresponding array of pixel groups 43 arranged in the zigzag pattern in the Y-axis direction. The reason for this is that the positions of the light-blocking regions visible from the first range 125 and the second range 127 can be made consistent among the pixel groups 43 arranged in the zigzag pattern in the Y-axis direction.

Although the liquid crystal 19 used in each of the display devices 1, 10, 20, and 30 is of a TN type, the liquid crystal 19 is not limited to this type and may alternatively be of other various types such as a fringe field switching (FFS) type, an in-plane switching (IPS) type, or a vertical alignment (VA) type.

Figure 24:
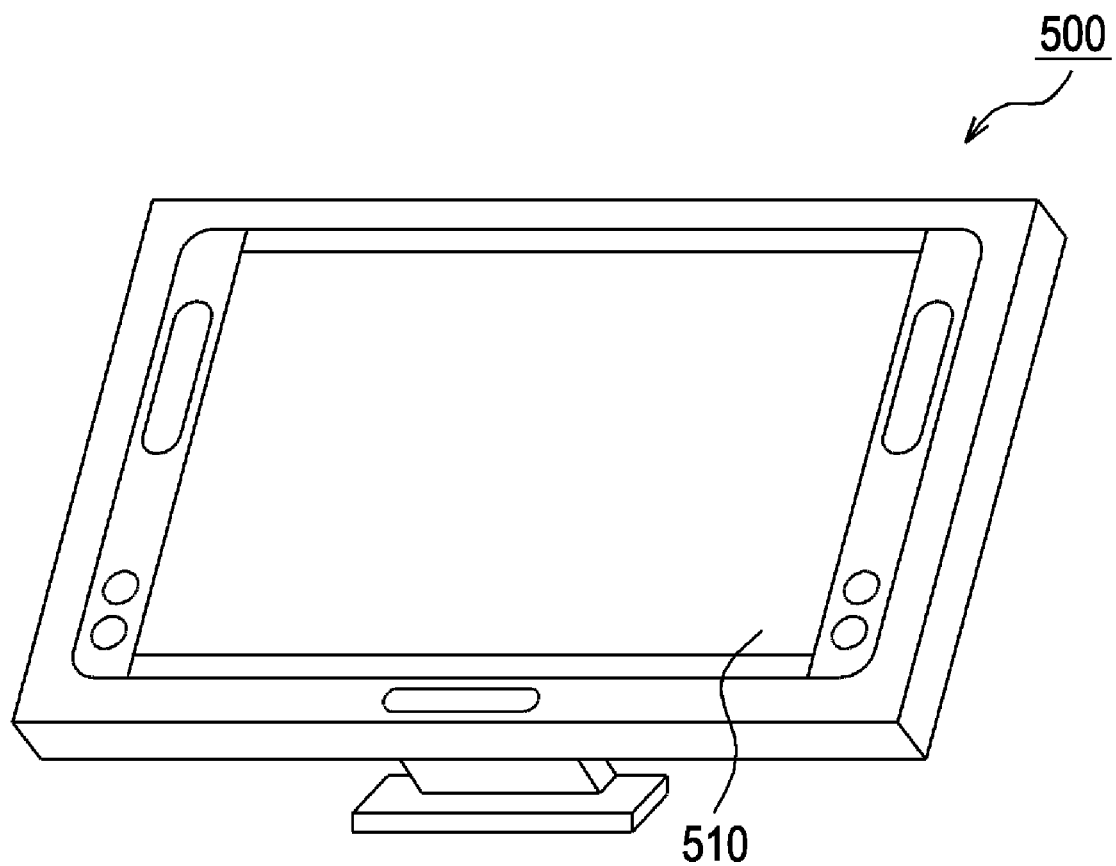
FIG. 24 is a perspective view of an electronic apparatus equipped with the display device according to the embodiment.
Figure 25A:
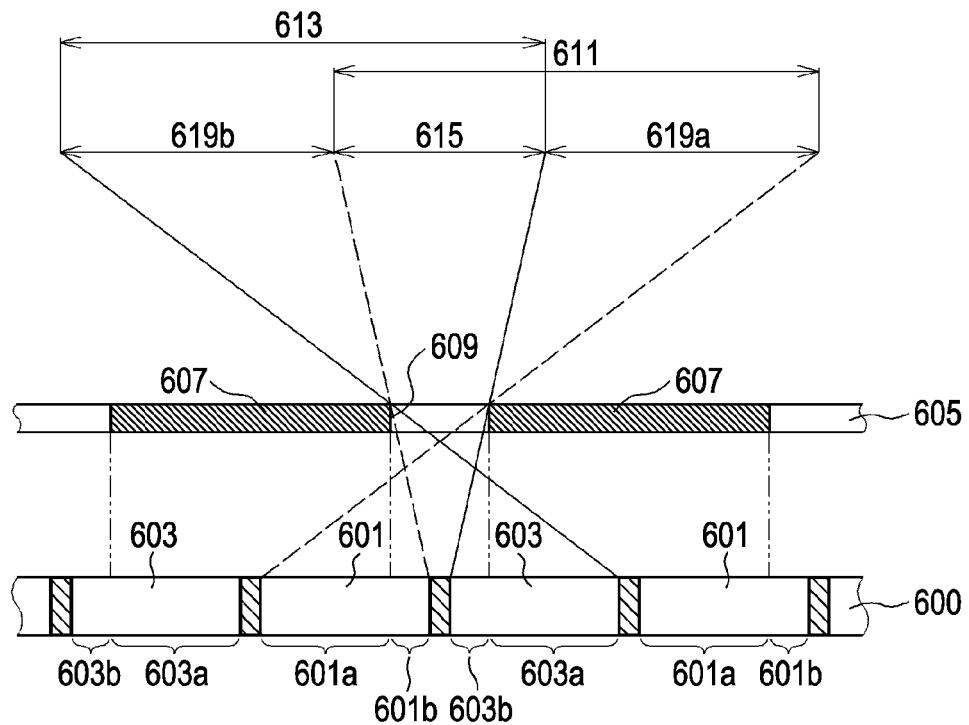
FIGS. 25A and 25B are cross-sectional views illustrating the related art.
Figure 25B:
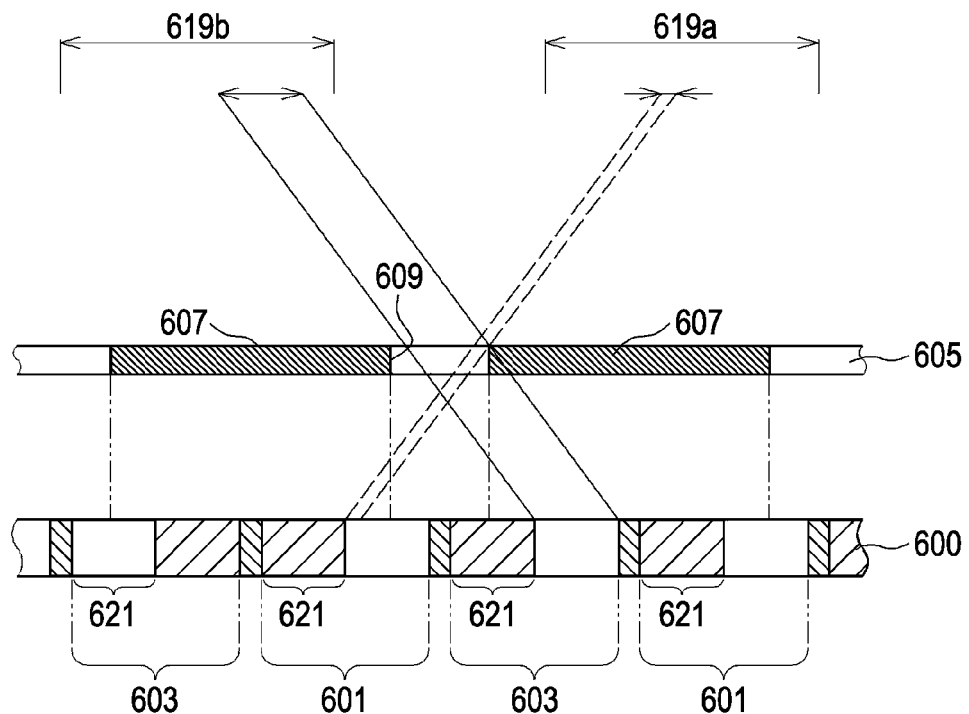
Figure 26:
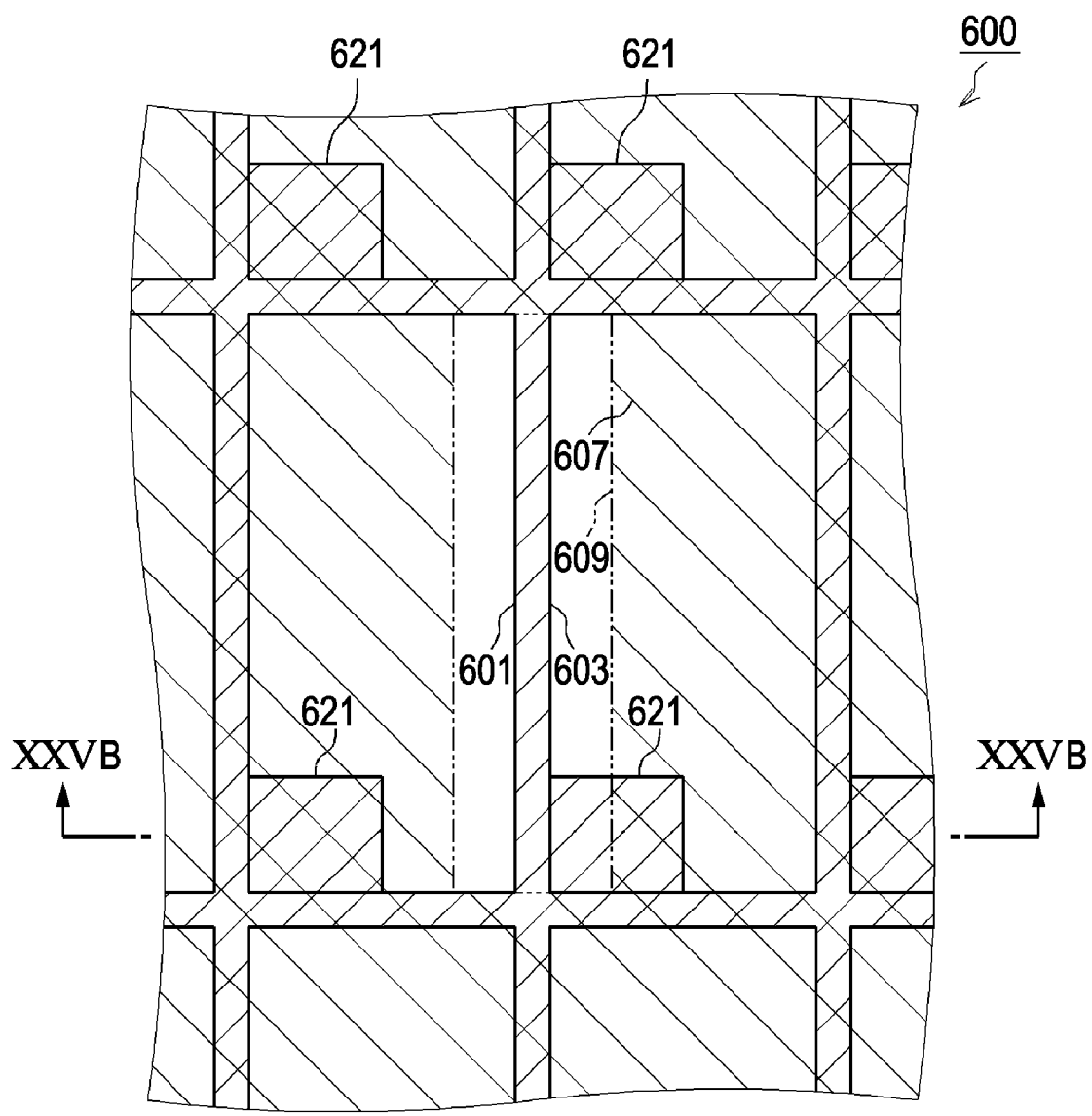
FIG. 26 is a plan view illustrating the related art.

Each of the above-described display devices 1, 10, 20, and 30 can be applied to a display portion 510 of an electronic apparatus 500 shown in FIG. 24. The electronic apparatus 500 serves as a display apparatus for a car navigation system. In the electronic apparatus 500, the display portion 510 to which the display device 1, 10, 20, or 30 is applied can allow an image of, for example, a map to be viewable as a first image from the driver's seat and an image of, for example, a moving picture to be viewable as a second image from the passenger's seat.

Since the display device 1, 10, 20, or 30 is employed as the display portion 510, the image brightness can be made uniform more readily between the first image and the second image in directional display.

Furthermore, in the electronic apparatus 500, the contrast ratios can be made symmetrical more readily between the first pixel 7₁ and the second pixel 7₂ in each pixel group 43 of the display device 1, 10, 20, or 30, thereby contributing to a higher display quality in directional display.

The electronic apparatus 500 is not limited to a display apparatus for a car navigation system, and may be other various kinds of electronic apparatuses, such as a portable telephone, a mobile computer, a digital still camera, a digital camcorder, an in-vehicle apparatus, or an audio apparatus.

What is claimed is:

1. An electro-optic device comprising:
    a plurality of pixels at least including first pixels that form a first image and second pixels that form a second image, the first pixels and the second pixels being arranged alternately in a first direction; and
    a light blocking element that overlaps the plurality of pixels in plan view,
    wherein the plurality of pixels are divided into a plurality of pixel groups, each pixel group corresponding to every two pixels of the plurality of pixels, the two pixels being one of the first pixels and one of the second pixels that are adjacent to each other in the first direction,
    wherein the light blocking element has openings, each opening being provided for a corresponding one of the pixel groups and located in a region that overlaps the two pixels of the pixel group in plan view, and
    wherein each first pixel has a light blocking region that partially intercepts light to be emitted from the first pixel, and each second pixel has a light blocking region that partially intercepts light to be emitted from the second pixel, the light blocking regions of the first pixel and the second pixel in each pixel group being positioned symmetrically to each other in plan view.

2. The electro-optic device according to claim 1, wherein, in plan view of the first pixels, the position of the light blocking regions in the first pixels is consistent among the pixel groups arranged in the first direction.

3. The electro-optic device according to claim 2, wherein the first pixels and the second pixels are also arranged alternately in a second direction that is orthogonal to the first direction, and
    wherein, in plan view of the first pixels, the position of the light blocking regions in the first pixels is consistent among the first pixels arranged in the second direction.

4. The electro-optic device according to claim 1, wherein the light blocking regions in the first pixel and the second pixel in each pixel group are positioned symmetrically to each other with respect to a line between the first pixel and the second pixel in plan view.

5. The electro-optic device according to claim 1, wherein the light blocking regions in the first pixel and the second pixel in each pixel group are positioned symmetrically to each other with respect to a point between the first pixel and the second pixel in plan view.

6. The electro-optic device according to claim 4, wherein the light blocking regions in the first pixel and the second pixel in each pixel group overlap the corresponding opening of the light blocking element in plan view.

7. The electro-optic device according to claim 4, wherein the light blocking regions in the first pixel and the second pixel in each pixel group are disposed outside a border of the corresponding opening of the light blocking element in plan view.

8. An electronic apparatus comprising the electro-optic device according to claim 1 as a display portion.

\* \* \* \* \*